US008731720B1

(12) United States Patent
Blackwell et al.

(10) Patent No.: US 8,731,720 B1
(45) Date of Patent: May 20, 2014

(54) REMOTELY CONTROLLED SELF-BALANCING ROBOT INCLUDING KINEMATIC IMAGE STABILIZATION

(71) Applicant: Anybots 2.0, Inc., Santa Clara, CA (US)

(72) Inventors: Trevor Blackwell, Mountain View, CA (US); Daniel Casner, Sunnyvale, CA (US); Scott Wiley, Los Altos, CA (US)

(73) Assignee: Anybots 2.0, Inc., Santa Clara, CA (US)

( * ) Notice: Subject to any disclaimer, the term of this patent is extended or adjusted under 35 U.S.C. 154(b) by 0 days.

(21) Appl. No.: 13/914,197

(22) Filed: Jun. 10, 2013

Related U.S. Application Data

(63) Continuation of application No. 13/445,806, filed on Apr. 12, 2012, now abandoned, which is a continuation of application No. 12/258,268, filed on Oct. 24, 2008, now Pat. No. 8,160,747.

(51) Int. Cl.
*G05B 15/00* (2006.01)
*G05B 19/00* (2006.01)
*G05B 19/18* (2006.01)

(52) U.S. Cl.
USPC ........... 700/259; 700/245; 700/250; 700/254; 700/257; 700/264; 901/46; 901/47; 901/48

(58) Field of Classification Search
CPC ........ G05B 15/00; G05B 19/00; G05B 19/18; G05B 19/427; G05B 2219/35448; G05B 2219/40131; G05B 2219/40133; G05B 2219/40134; G05B 2219/40136; G05B 2219/40146; A63F 13/10; A63F 2300/1087; A63F 2300/204; A63F 2300/8017; A63F 2300/69; A63H 30/04; A63H 17/00; G06F 3/013; G06F 3/012; G06F 3/011; G06T 3/0012; G06T 9/00; H04N 13/0239; H04N 5/23206; H04N 13/0059; B25J 3/04; B25J 13/02; B25J 13/04; B25J 13/08; B25J 13/084; B25J 15/0009; B25J 9/1689
See application file for complete search history.

(56) References Cited

U.S. PATENT DOCUMENTS

| 6,016,385 | A  | * | 1/2000  | Yee et al. ...................... 700/245 |
|-----------|----|---|---------|-------------------------------------------|
| 6,084,979 | A  | * | 7/2000  | Kanade et al. ................ 382/154    |
| 6,292,713 | B1 | * | 9/2001  | Jouppi et al. ................. 700/245   |
| 6,917,715 | B2 | * | 7/2005  | Berstis .......................... 382/239 |
| 7,190,392 | B1 | * | 3/2007  | Maguire, Jr. ................. 348/121    |
| 2006/0223637 | A1 | * | 10/2006 | Rosenberg ..................... 463/47 |
| 2008/0086241 | A1 | * | 4/2008  | Phillips et al. .................... 701/2 |

* cited by examiner

*Primary Examiner* — Khoi Tran
*Assistant Examiner* — Bao Long T Nguyen
(74) *Attorney, Agent, or Firm* — Peters Verny, LLP

(57) ABSTRACT

Systems and methods as described for providing visual telepresence to an operator of a remotely controlled robot. The robot includes both video cameras and pose sensors. The system can also comprise a head-tracking sensor to monitor the orientation of the operator's head. These signals can be used to aim the video cameras. The controller receives both the video signals and the pose sensor signals from the robot, and optionally receives head-tracking signals from the head-tracking sensor. The controller stitches together the various video signals to form a composite video signal that maps to a robot view. The controller renders an image to a display from that portion of the composite video signal that maps to an operator view. The relationship of the operator view to the robot view is varied according to the signals from the pose sensors and the head-tracking sensor.

9 Claims, 14 Drawing Sheets

REMOTELY CONTROLLED SELF-BALANCING ROBOT INCLUDING KINEMATIC IMAGE STABILIZATION

CROSS-REFERENCE TO RELATED APPLICATIONS

This application is a continuation of U.S. patent application Ser. No. 13/445,806 filed on Apr. 12, 2012 and entitled "Remotely Controlled Self-Balancing Robot including Kinematic Image Stabilization," which is a continuation of U.S. patent application Ser. No. 12/258,268 filed on Oct. 24, 2008 and also entitled "Remotely Controlled Self-Balancing Robot including Kinematic Image Stabilization," now U.S. Pat. No. 8,160,747, both incorporated herein by reference. This application is related to U.S. patent application Ser. No. 12/242,532 filed on Sep. 30, 2008 and entitled "Self-Balancing Robot including Flexible Waist," now abandoned, which is also incorporated herein by reference.

BACKGROUND OF THE INVENTION

1. Field of the Invention

The present invention relates generally to the field of robotics and more particularly to mobile self-balancing robots.

2. Related Art

Telepresence refers to the remote operation of a robotic system through the use of a human interface. Telepresence allows an operator of the robotic system to perceive aspects of the environment in which the robotic system is located, without having to physically be in that environment. Telepresence has been used, for example, by doctors to perform medical operations without being present in the operating room with the patient, or by military personnel to inspect a bomb.

Robotic systems that provide telepresence capabilities are either fixed in a particular location, or provide a degree of mobility. Of those that provide mobility, however, the forms tend to be close to the ground and built on wide platforms with three or more legs or wheels for stability. These systems, in short, lack a generally upright human form, and accordingly, an operator cannot perceive the remote environment from a natural upright perspective with the normal range of motion one would have if actually present in the remote environment.

One problem that is commonly encountered with robotic systems that provide visual telepresence capabilities through the use of a head-mounted display is that the operator can become disoriented and/or experience nausea. These effects have been found to be due to two principle causes, the motion of the robot such as rocking, and the lag between when the operator moves her head to look in a new direction and when the camera on the robot follows.

Some two-wheeled self-balancing robotic systems have been developed in recent years. One such system is controlled by a human rider. Absent the rider, the system merely seeks to keep itself in an upright position with a feedback loop that senses any tilting from this upright position and rotates the two wheels to restore the upright position. A user standing on the system may control movement by leaning back and forth. This causes a tilt away from the upright position, which is interpreted as a command to move in the direction of the tilt.

SUMMARY

An exemplary robotic system comprises a base, a leg segment extending from the base, and a torso segment pivotally coupled to the leg segment by a waist joint. The base is supported on wheels and includes at least one motor configured to drive the wheels. The exemplary robotic system also comprises a first actuator, such as a pneumatic cylinder, configured to change a waist angle defined between the leg segment and the torso segment, a first control system configured to maintain balance of the robotic system on the wheels, and a second control system configured to change a base angle responsive to changing the waist angle. Here, the base angle is defined between a first reference plane having a fixed relationship to the base and a second reference plane having a fixed relationship to an external frame of reference. In some embodiments, a width of the base as measured along an axis of the wheels is less than half of a height of the robotic system when the waist angle is about 180°. It will be understood that maintaining balance is a dynamic process whereby a metastable state is actively maintained over no more than two points of contact between the robotic system and the surface on which it is supported to prevent the robotic system from falling over.

Embodiments of the exemplary robotic system can further comprise a head pivotally attached to the torso segment. In some of these embodiments, the robotic system further comprises logic configured to maintain a fixed orientation of the head, relative to an external frame of reference, while changing the waist angle. Additional embodiments further comprise a lean joint disposed between the leg segment and the base. Here, the lean joint can be configured to tilt the leg segment relative to the base around an axis that is approximately perpendicular to an axis of rotation of the waist joint. Some of these embodiments further comprise a second actuator configured to move the leg segment relative to the base around the lean joint. Also, some embodiments that include the lean joint further comprise a stabilizer configured to restore the leg segment to an orientation perpendicular to the base. Various embodiments of the exemplary robotic system can further include a tether, and in some of these embodiments the robotic system further comprises an actuated tail extending from the base and configured to move the tether out of the way of the wheels.

In various embodiments, the waist angle can vary within a range of about 180° to at least less than about 90°, and wherein longitudinal axes of the torso and leg segments are approximately collinear when the waist angle is about 180° so that the robotic system can bring the head proximate to the ground and/or achieve a sitting posture. Also in various embodiments, the robotic system can transition from the sitting posture, in which the robotic system is supported on both wheels and a third point of contact with the ground, and a human-like upright posture balanced on the wheels. For purposes of tailoring the center of gravity of the robotic system, such as a battery system, in some embodiments a power source configured to provide power to the at least one motor is disposed within the torso segment. The center of gravity of the combined body segments above the waist joint, such as the torso segment and head, can be further than half their overall length from the waist joint, in some embodiments.

In various embodiments the first control system comprises a feedback loop that includes a balance sensor, such as a gyroscope, and balance maintaining logic. In these embodiments the balance maintaining logic receives a balance signal from the balance sensor and is configured to drive the wheels of the robotic system to maintain the balance of the robotic system. In various embodiments the second control system comprises base angle determining logic configured to receive a waist angle input, determine a new base angle from the waist angle input, and provide the new base angle to the balance maintaining logic.

Another exemplary robotic system comprises a robot and a human interface in communication with the robot. Here, the robot comprises a self-propelled base, a leg segment extending from the base, a torso segment pivotally coupled to the leg segment by a waist joint, an actuator configured to change a waist angle defined between the leg segment and the torso segment, and base angle determining logic configured to determine a base angle from a waist angle input. The actuator is configured to change the waist angle responsive to a movement control input.

The human interface comprises a position sensor configured to take a measurement of an angle made between a first reference axis having a fixed relationship to the position sensor and a second reference axis having a fixed relationship to an external frame of reference. The human interface also comprises a controller configured to receive the measurement and communicate the movement control input to the actuator of the robot. The human interface, in some embodiments, further comprises a joystick for controlling a position of the robot.

Some embodiments of the exemplary robotic system further comprise logic configured to determine the waist angle input from the movement control input and provide the waist angle input to the base angle determining logic. Still other embodiments of the exemplary robotic system further comprise a control system configured to change the base angle while changing the waist angle, the base angle being defined between a first reference plane having a fixed relationship to the base and a second reference plane having a fixed relationship to an external frame of reference.

An exemplary method of the invention comprises maintaining balance of a robot on two wheels, the wheels disposed on opposite sides of a base of the robot, and maintaining the robot at an approximate location while bending the robot at a waist joint, the waist joint pivotally joining a torso segment to a leg segment extending from the base. In these embodiments, balance is maintained by measuring a change in a base angle of the robot, and rotating the wheels to correct for the change so that the wheels stay approximately centered beneath the center of gravity of the robot. Here, the base angle is defined between a first reference plane having a fixed relationship to the base and a second reference plane having a fixed relationship to an external frame of reference. Maintaining the robot at the approximate location while bending the robot at the waist joint comprises changing a base angle while changing a waist angle such that the wheels do not appreciably rotate. Here, the waist angle is defined between the torso segment and the leg segment and while changing the waist angle. Changing the base angle can include, for example, determining a target base angle from a target waist angle. In some embodiments, the method further comprises receiving a target waist angle. Changing the waist angle can include, in some embodiments, receiving a target waist angle from a sensor configured to measure an orientation of a torso of a person. In those embodiments where the robot includes a head, methods can further comprise changing an orientation of the head of the robot while changing the waist angle, or maintaining a fixed orientation of the head of the robot while changing the waist angle. In those embodiments that include changing the orientation of the head, changing the orientation of the head can comprise monitoring an orientation of a head of a person, in some embodiments.

The robotic systems of the invention may be tethered or untethered, operator controlled, autonomous, or semi-autonomous.

Still another exemplary robotic system comprises a base, at least one motor, a lower segment attached to the base, an upper segment pivotally attached to the lower segment at a waist, a balance sensor configured to sense an angle of the base relative to a horizontal plane, and balance maintaining logic configured to maintain the balance of the base responsive to the sensed angle of the base by providing a control signal to the at least one motor. The robotic system also comprises a position sensor configured to detect a position of the base, and movement logic configured to maintain the base at a preferred position responsive to the detected position of the base. The robotic system further comprises a waist angle sensor configured to detect a waist angle between the lower segment and the upper segment, and a base angle calculator configured to calculate a base angle responsive to the detected waist angle, the base angle being calculated to approximately maintain a center of gravity of the system.

Another exemplary method comprises receiving a base angle of a base from a balance sensor and receiving a waist angle from a waist sensor. Here, the waist angle is an angle between an upper segment and a lower segment, the upper segment is pivotally coupled to the lower segment, and the lower segment is supported by the base. The method also comprises receiving a position of the base by monitoring rotation of a wheel supporting the base, calculating a first preferred angle of the base responsive to the received waist angle, and using a difference between the received position of the base and a desired position of the base, and the received base angle to balance the base at approximately the first preferred angle. The method can further comprise receiving an adjustment to the first preferred position of the base from a user input. In various embodiments, the method further comprises receiving a desired waist angle from a user input, changing the waist angle to the desired waist angle, calculating a second preferred angle of the base responsive to the changed waist angle, and balancing the base at approximately the second preferred angle.

Still another exemplary robotic system comprises a base, a leg segment extending from the base, and a torso segment pivotally coupled to the leg segment by a waist joint. The base is supported on wheels and includes at least one motor configured to drive the wheels. The exemplary robotic system also comprises an actuator configured to change a waist angle defined between the leg segment and the torso segment, a first control system configured to maintain balance of the robotic system on the wheels, and a second control system configured to change the waist angle responsive to changing a base angle. Here, the base angle is defined between a first reference plane having a fixed relationship to the base and a second reference plane having a fixed relationship to an external frame of reference.

Yet another exemplary robotic system comprises a robot, a plurality of video cameras attached to the robot, such as a self-balancing robot, a head-tracking sensor configured to track the orientation of a head of an operator, and a controller. The plurality of video cameras includes a pair of stereo cameras aimed approximately in the same direction, each of the pair of stereo cameras having a field of view, and a peripheral camera aimed differently than the pair of stereo cameras and having a field of view that at least partially overlaps the field of view of at least one of the pair of stereo cameras. The controller is configured to control the orientations of the plurality of video cameras responsive to the head-tracking sensor. In some instances the robot comprises a plurality of pose sensors.

A further exemplary robotic system comprises a robot including a plurality of pose sensors, a plurality of video cameras attached to the robot, a display, and a controller in communication between the robot and the display. The plurality of video cameras includes a pair of stereo cameras aimed approximately in the same direction, each of the pair of stereo cameras having a field of view, and a peripheral camera aimed differently than the pair of stereo cameras and having a field of view that at least partially overlaps the field of view of at least one of the pair of stereo cameras. The controller is configured to receive video signals from the plurality of video cameras, receive signals from the pose sensors, and render an image to the display. The controller is configured to render the image by stitching together the video signal from the peripheral camera with the video signals from the pair of stereo cameras to form a composite video signal that maps to a robot view, repositioning an operator view relative to the robot view to correct for motion of the robot using the signals received from the pose sensors, and rendering to the display a portion of the composite video signal that maps to the operator view as the rendered image. In some embodiments the robotic system also comprises a second controller configured to control the orientations of the plurality of video cameras responsive to the head-tracking sensor.

In various embodiments the robot can be a self-balancing robot. The plurality of cameras can be arranged to be approximately confocal. The plurality of pose sensors can be selected from the group consisting of an inertial measurement unit, an optical encoder, and a linear potentiometer. The display can comprise, for example, a head-mounted display or a video monitor. The robotic system can also comprise, in some instances, a head-tracking sensor configured to track the orientation of a head of an operator, and wherein the controller is further configured to additionally reposition the operator view relative to the robot view to correct for motion of the head of the operator using the signals received from the head-tracking sensor. The head-tracking sensor and the display, in some embodiments, are both integrated within a head-mounted display.

In various embodiments the controller is further configured to apply lens corrections to the video signals received from the plurality of cameras. The controller can also be configured to generate a heads up display and to add the heads up display to the rendered image. In some of these embodiments, the robot optionally further includes a data source and in these embodiments the controller is further configured to generate the heads up display from data received from the data source. In further of these embodiments, the robotic system further comprises a data source that is external to the robot, and in these embodiments the controller is further configured to generate the heads up display from data received from the external data source.

An exemplary controller for a robotic system comprises video decompression logic configured to decompress video signals received from a plurality of video cameras, lens correction logic configured to remove image distortions from the decompressed video signals received from the video decompression logic, and operator view in robot space logic configured to receive signals from a plurality of pose sensors, and generate a first transformation between a robot frame of reference and an operator frame of reference from the signals received from the pose sensors. The exemplary controller also comprises image rendering logic configured to render an image from the decompressed and corrected video signals. The image rendering logic is configured to render the image by stitching together the decompressed and corrected video signals to form a composite video signal that maps to a robot view, applying the first transformation to an operator view in order to reposition the operator view relative to the robot view, and by rendering to the display a portion of the composite video signal that maps to the operator view.

In some embodiments, the operator view in robot space logic is further configured to receive signals from a head-tracking sensor and generate a second transformation responsive to the signals from the head-tracking sensor. The controller can also comprise heads up display generation logic configured to receive data from a data source, generate a heads up display from the data, and provide the heads up display to the image rendering logic. Additionally, the image rendering logic can be further configured to vary a size of the portion of the composite video signal that maps to the operator view. Further, stitching together the decompressed and corrected video signals can comprises cross fading.

DETAILED DESCRIPTION OF THE INVENTION

The present invention is directed to mobile self-balancing robots characterized by a generally human-like upright posture. These robots are human-like in that they are capable of bending at a waist and include control systems for maintaining balance, for maintaining a fixed location while bending at the waist, and for changing the location and the orientation of the robot. The mobility, ability to bend at the waist, and upright posture make the robots of the present invention suitable for telepresence and other applications. The present invention is additionally directed to robotic systems that allow a person to remotely control a robot through a human interface. Methods of the present invention are directed to maintaining the balance of the robot at a fixed location while executing a bend at the waist, and in some embodiments additionally moving a head of the robot while bending at the waist. These methods optionally also include steps in which a person controls the bending at the waist, head movements, movements of arms, and/or controls other aspects of the robot through a human interface.

Figures 1, 2:
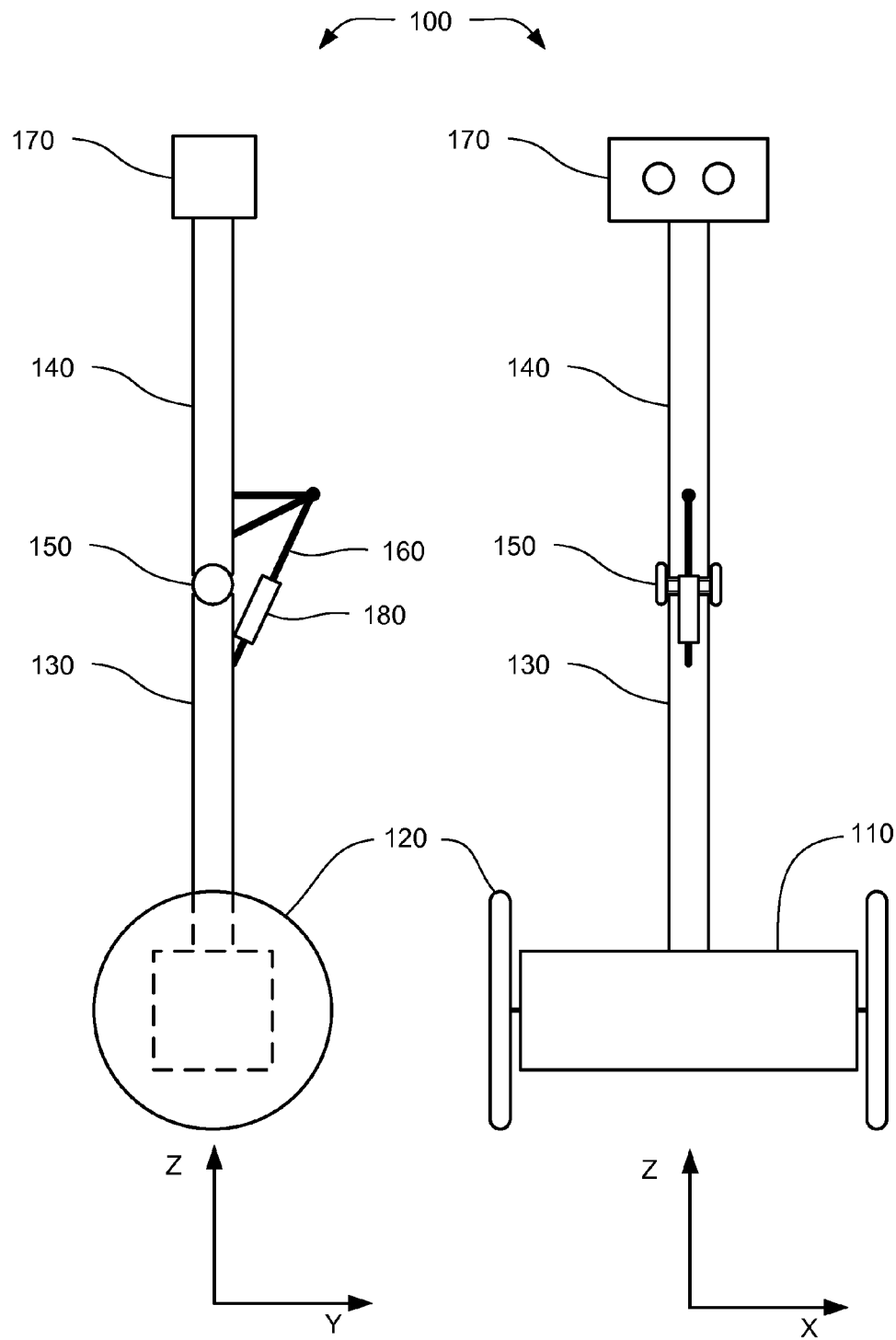
FIGS. 1 and 2 show side and front views, respectively, of a mobile self-balancing robot according to an embodiment of the present invention.

FIGS. 1 and 2 show side and front views, respectively, of a mobile self-balancing robot 100 according to an embodiment of the present invention. The robot 100 has a generally human-like upright posture and the ability to bend at a midpoint in a manner analogous to a person bending at the waist. The robot 100 comprises a self-propelled base 110 supported on wheels 120 and including a motor (not shown) configured to drive the wheels 120. Wheels 120 optionally consist of one or two wheels. In some embodiments, the width of the base 110 as measured along the axis of the wheels 120 is less than half of the height of the robot 100 when the robot 100 is in a fully upright configuration. Dynamically balancing robots, such as robot 100, are sometimes referred to as inverted pendulum robots.

The robot 100 also comprises a lower segment pivotally coupled to an upper segment at a waist. In the given example, the lower segment comprises a leg segment 130 extending from the base 110, and the upper segment comprises a torso segment 140 coupled to the leg segment 130 by a waist joint 150. The robot 100 further comprises an actuator 160 configured to bend the robot 100 at the waist joint 150. The ability to bend at the waist joint 150 allows the robot 100 to sit down and get up again, in some embodiments, as discussed below with respect to FIG. 10.

In various embodiments, the torso segment 140, the leg segment 130, or both, include one or more communication components. One example of a communication component is a communication port, such as a Universal Serial Bus (USB) port, to allow a person to connect a computing system to the robot 100. Another example of a communication component is a video display screen. The video display screen can permit a remote operator to display information, graphics, video, and so forth to those near the robot 100. In some embodiments, the video display screen includes a touch screen to allow input from those near the robot 100.

The robot 100 optionally also includes a head 170 attached to the torso segment 140. In some embodiments, the head 170 is disposed at the end of the torso segment 140 that is opposite the end of the torso segment 140 that is joined to the waist joint 150, as shown in FIGS. 1 and 2. In additional embodiments, the head 170 is pivotally attached to the torso segment 140, as discussed in greater detail below with respect to FIG. 7. The ability of the robot 100 to bend at the waist joint 150 allows the head 170 to be moved through a range of motion that in some embodiments can bring the head 170 close to the ground.

The head 170 can include instrumentation, such as sensors, cameras, microphones, speakers, a laser pointer, and/or the like, though it will be appreciated that such instrumentation is not limited to the head 170 and can also be disposed elsewhere on the robot 100. for instance, the laser pointer can be disposed on an arm or finger of the robot 100. The head 170 can include one or more illuminators to illuminate the environment. Illuminators can be provided to produce colored illumination such as red, green, and blue, white illumination, and infrared illumination, for instance. Some embodiments also include a laser to serve as a pointer, for example, that can be controlled by a remote operator.

In further embodiments, the robot 100 comprises a lean joint (not shown) that couples the leg segment 130 to the base 110. The lean joint is described in greater detail with respect to FIG. 8. In still other embodiments, the robot 100 includes one or more arms (not shown) extending from the torso segment 140 and/or the leg segment 130. The arms can include a human-like hand and/or a pneumatically driven gripper or other end effectors. As discussed in greater detail below, control of the motion of the robot 100 can be autonomous, through a human interface, or through the human interface with some autonomous capabilities.

FIGS. 1 and 2 also illustrate a coordinate axis system defined relative to the robot 100. As can be seen in FIGS. 1 and 2, a Z-axis, also termed a vertical axis, is disposed parallel to the Earth's gravitational axis. When the robot 100 is at rest and balanced on the wheels 120, the center of gravity of the robot 100 lies along the vertical axis, e.g. is centered above the wheels. It will be appreciated that when the robot 100 is travelling forward or backward, the center of gravity will be either forward of, or behind, the vertical axis. When the robot 100 is on a level surface and at rest, the vertical axis passes through a midpoint between the centers of wheels 120.

FIG. 1 also shows a Y-axis perpendicular to the Z-axis. The Y-axis, also termed a horizontal axis, is aligned with the direction of travel of the robot 100 when both wheels 120 are driven together in the same direction and at the same rate. FIG. 2 shows an X-axis, also termed a transverse axis, which is perpendicular to both the Z-axis and the Y-axis. The transverse axis runs parallel to a line defined through the centers of the wheels 120. The frame of reference defined by this coordinate system moves with the robot 100 and is termed the internal frame of reference. Another frame of reference, termed the external frame of reference, is fixed relative to the environment around the robot 100.

Figure 3:
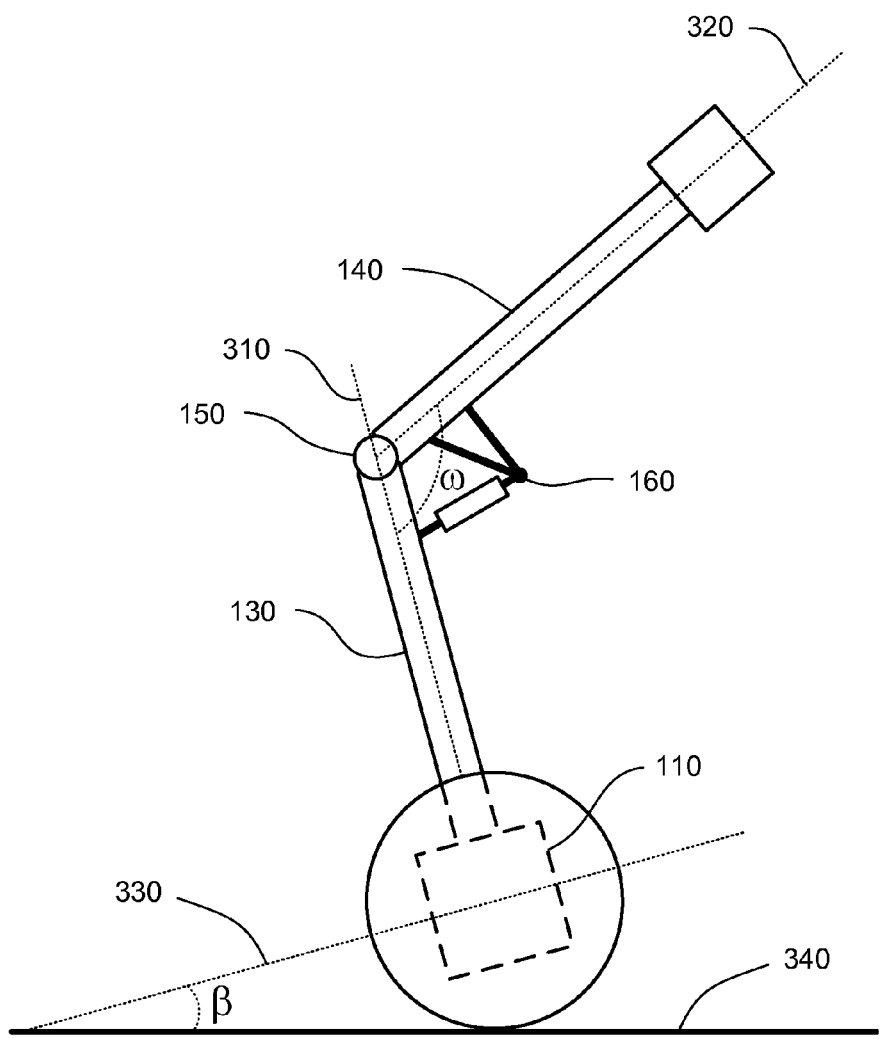
FIG. 3 shows a side view of the robot of FIGS. 1 and 2 bent at a waist joint according to an embodiment of the present invention.

FIG. 3 shows a side view of the robot 100 bent at the waist joint 150, according to an embodiment of the present invention. As illustrated in FIG. 3, a waist angle, w, is defined between the leg segment 130 and the torso segment 140 at the waist joint 150, and the actuator 160 is configured to change the waist angle. More specifically, the waist angle is defined as an angle between a longitudinal axis 310 of the leg segment 130 and a longitudinal axis 320 of the torso segment 140. Another angle, termed a base angle, β, that may be defined between a base reference plane 330 of the base 110 and the horizontal plane 340. Depending on the orientation of the base 100, the base reference plane 330 and the horizontal plane 340 may be parallel, but when not parallel the base reference plane 330 and the horizontal plane 340 intersect along a line that is parallel to the X-axis. In some embodiments, the robot 100 can bend at the waist joint 150 through a range of waist angles from about 180° to at least less than about 90° to be able to pick items off the ground and to be able to inspect beneath low objects. In further embodiments, the robot 100 can bend at the waist joint 150 through a range of waist angles from about 180° to about 45°, 30°, 15°, or 0°. When the waist angle is about 180°, as in FIGS. 1 and 2, the longitudinal axes 320, 310 of the torso and leg segments 140, 130 are approximately collinear.

The base reference plane 330 has a fixed relationship relative to the base 110, however, that relationship can be defined in a variety of different ways. In FIG. 3, for example, the base reference plane 330 is defined through the centers of the wheels 120 and parallel to the top and bottom surfaces of the base 110. In other embodiments, however, the base reference plane 330 is defined by either the top surface or the bottom surface of the base 110, and in still other embodiments the base reference plane 330 is defined through the leading top edge and trailing bottom edge of the base 110 (i.e., across the diagonal of the base 110 in FIG. 3). The base reference plane 330 can also be defined as being perpendicular to the longitudinal axis 310 of the leg segment 130. It is also noted that the horizontal plane 340 serves as a convenient reference, however, the base angle can also be defined between any other plane in the external frame of reference, such as a vertical plane. Thus, stated more generally, the base angle is defined between a first reference plane having a fixed relationship to the base 110 and a second reference plane having a fixed relationship to the external frame of reference.

As noted above, the base 110 is supported on wheels 120 and includes one or more motors (collectively referred to herein as "the motor") configured to drive the wheels 120. The motor can be an electric motor, for example, which in some embodiments is powered by an internal power source such as a battery system in the base 110, while in other embodiments the motor is powered by an external power source coupled to the base 110 through a tether (not shown; see FIG. 8). In some embodiments, the internal power source is disposed above the waist joint 150, for example, in the torso segment 140. Other sources of electric power, such as a fuel cell, can also be employed, and it will be understood that the motor is not particularly limited to being electrically powered, but can also comprise an internal combustion engine, for example. Embodiments of the robot 100 can also include two motors so that each wheel 120 can be driven independently.

The wheels 120, in various embodiments, are adapted to the particular surfaces on which the robot 100 is intended to operate and therefore can be solid, inflatable, wide, narrow, knobbed, treaded, and so forth. In further embodiments, the wheels can be replaced with non-circular tracks such as tank treads.

The actuator 160, in some embodiments, comprises an hydraulic or pneumatic cylinder 180 connected between the torso segment 140 and either the leg segment 130 as shown, or the base 110. In those embodiments illustrated by FIGS. 1-3, the cylinder 180 is connected to a ball joint extending frontward from the torso segment 140 and is also pivotally attached to the leg segment 130. Other actuators, including electric motors, can also be employed in various embodiments. In some of these embodiments, the electric motor is coupled to a drive train comprising gears, belts, chains, or combinations thereof in order to bend the robot 100 at the waist joint 150.

Generally, the center of gravity of robot 100 should be as high as possible to make dynamic balancing more stable and easier to control. In those embodiments in which the robot 100 is configured to sit down and stand up again (see FIG. 10), the center of gravity of the torso segment 140 should also be as close to the head 170 as possible, and the center of gravity of the leg segment 130 should additionally be as close to the wheels 120 as possible so that the change in the base angle is maximized as a function of the change in the waist angle. In some of these embodiments, the center of gravity of the combined body segments above the waist (e.g., the torso segment 140 and the head 170) is further than half their overall length from the waist joint 150. In those embodiments in which the robot 100 is configured with arms to be able to pick up items off of the ground, the center of gravity of both segments 130, 140 should be as close to the waist joint 150 as possible so there is a minimum change in the base angle as a function of the change in the waist angle.

Figure 4:
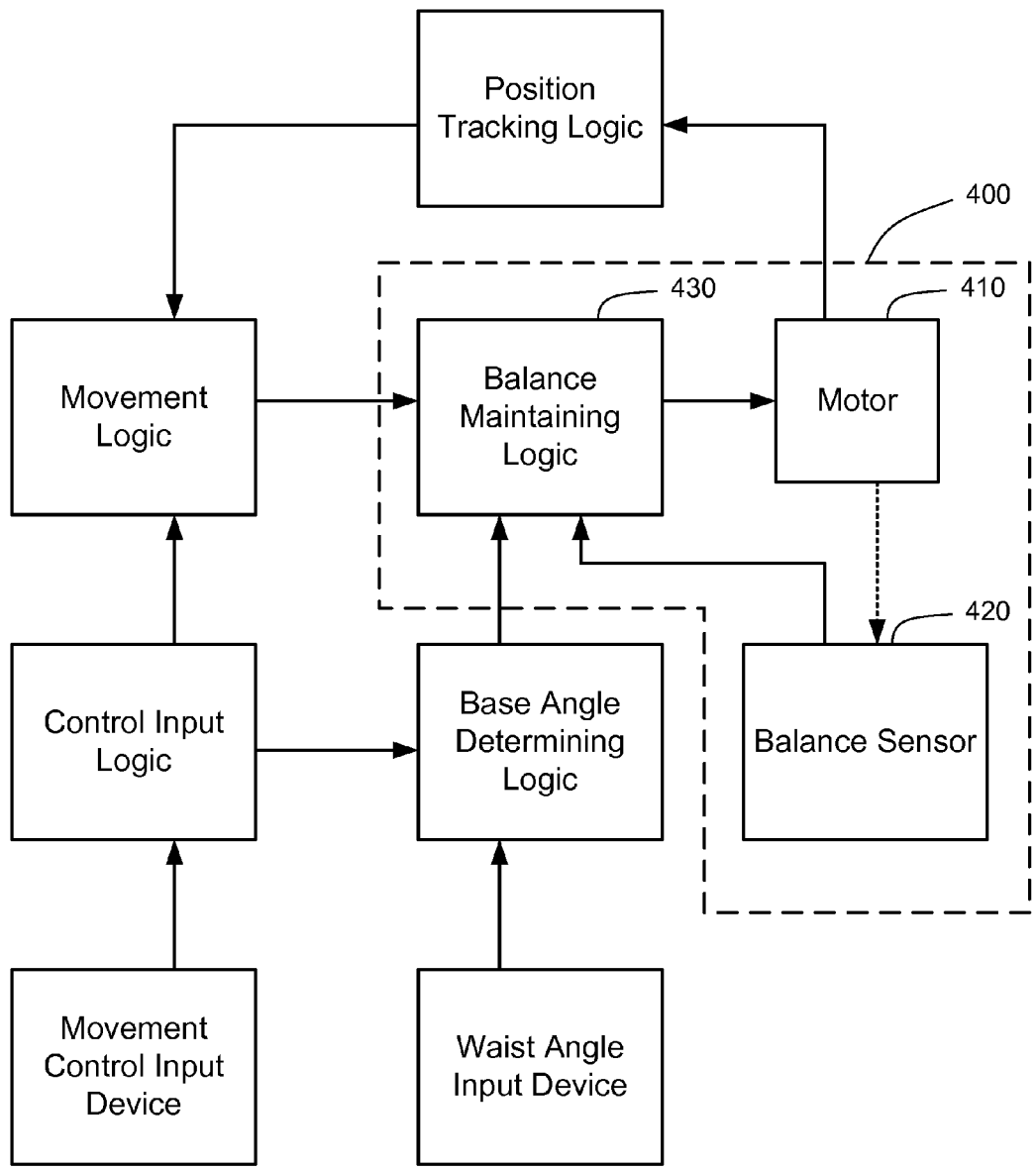
FIG. 4 is a schematic representation of a first control system configured to maintain the balance of the robot of FIGS. 1-3 on the wheels, according to an embodiment of the present invention.
Figure 5:
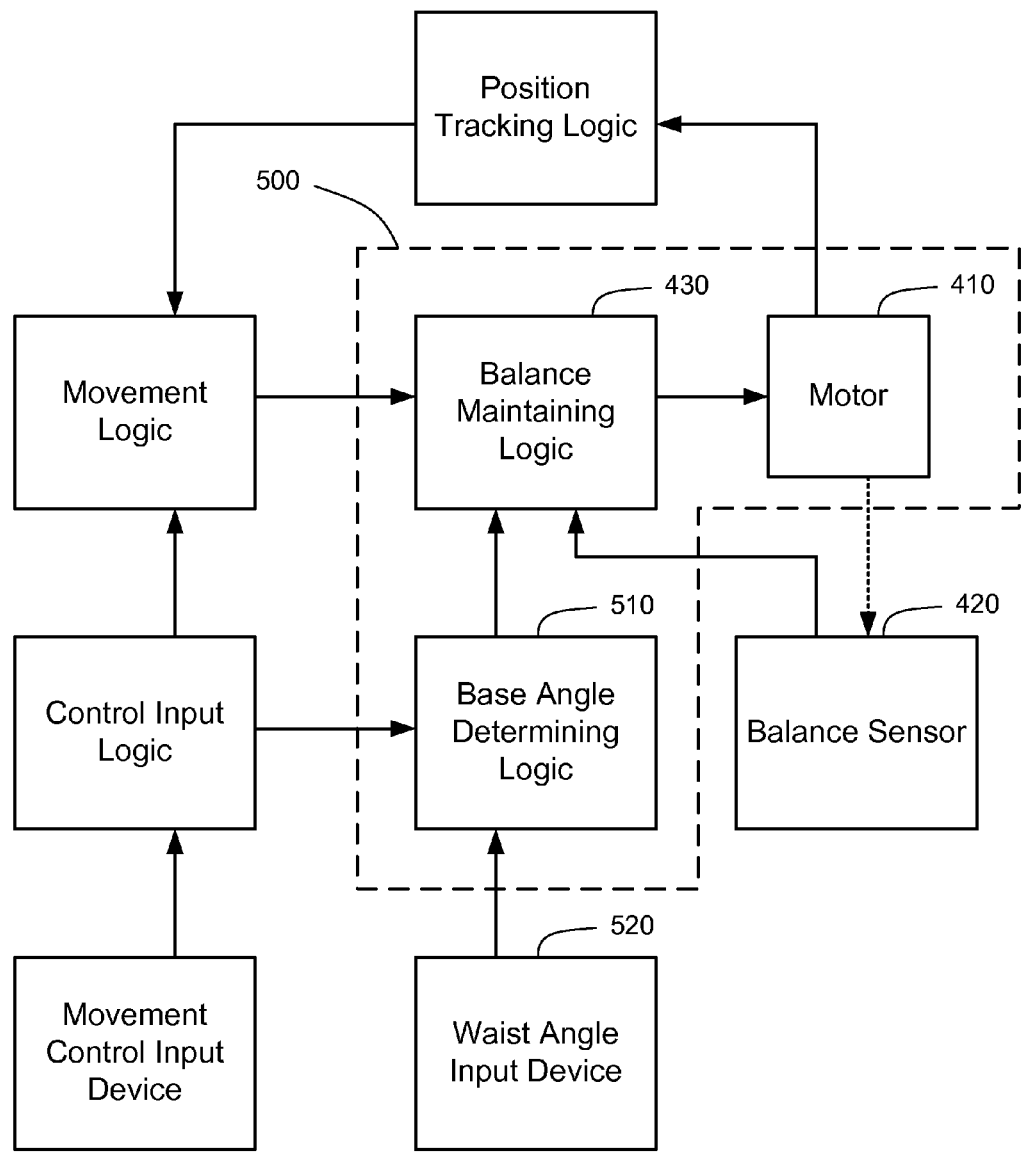
FIG. 5 is a schematic representation of a second control system configured to coordinate a change in the base angle of the robot of FIGS. 1-3 to accommodate a change in the waist angle of the robot of FIGS. 1-3, according to an embodiment of the present invention.

The robot 100 also comprises several control systems (not shown). A first control system, discussed below with reference to FIG. 4, is configured to maintain the balance of the robot 100 on the wheels 120. FIG. 5 describes a second related control system configured to coordinate a change in the base angle to accommodate a change in the waist angle. A third related control system allows the robot 100 to change location and/or orientation within the external frame of reference, as discussed with respect to FIG. 6.

FIG. 4 is a schematic representation of a first control system 400 configured to maintain the balance of the robot 100 of FIGS. 1-3 on the wheels 120, according to an exemplary embodiment. Other control components shown in FIG. 4 that are outside of the control system 400 are discussed with respect to FIGS. 5 and 6, below. The first control system 400 comprises the motor 410 in the base 110 for driving the wheels 120, a balance sensor 420, and balance maintaining logic 430. In operation, the balance maintaining logic 430 receives a balance signal from the balance sensor 420 and controls the motor 410, for instance with a control signal, to apply torque to the wheels 120, as necessary to maintain balance on the wheels 120.

The balance sensor 420 can be disposed in the base 110, the leg segment 130, the torso segment 140, or the head 170, in various embodiments. The balance sensor 420 can comprise, for example, a measurement system configured to measure acceleration along the three mutually perpendicular axes of the internal frame of reference noted in FIGS. 1 and 2. Accordingly, the balance sensor 420 can comprise a set of accelerometers and/or gyroscopes, for example. The balance maintaining logic 430 uses the acceleration measurements along the Z and Y-axes, in particular, to determine how much the robot 100 is tilting forward or backward. It will be appreciated that this tilting constitutes changing the base angle from a target base angle. This target base angle is the base angle at which the system is estimated to be balanced. Based on this determination, the balance maintaining logic 430 determines whether to rotate the wheels 120 clockwise or counterclockwise, and how much torque to apply, in order to counteract the tilting sufficiently to restore the base angle to the target base angle. The change in the orientation of the robot 100 as the balance maintaining logic 430 controls the motor 410 to drive the wheels 120 is then detected by the balance sensor 420 to close a feedback loop.

FIG. 5 is a schematic representation of a second control system 500 configured to coordinate a change in the target base angle of the robot 100 of FIGS. 1-3 to accommodate a change in the waist angle of the robot 100 of FIGS. 1-3, according to an embodiment of the present invention. It will be appreciated that, absent the compensation provided by the second control system 500, a change in the waist angle will change the center of gravity of the robot 100 and tilt the base. The first control system 400 will respond to this tilt by adjusting the position of the robot 100 by either rolling the robot 100 forward or backward causing the robot 100 to move from its location.

For example, if the waist angle is 180° (as illustrated in FIG. 1) and the base reference plane 330 is defined as shown, then the target base angle is 0° (e.g., parallel to the X-Y plane). If the waist angle is then changed to 150°, moving the center of gravity forward of the wheels 120, and the change to the waist angle is made without changing the target base angle, then the robot 100 will continuously roll forward in an attempt to keep from falling over. Without compensating for the change in waist angle, there is no static balanced state.

The second control system 500 is configured to determine the target base angle as a function of either a measured waist angle as the waist angle is changing or as a function of a target waist angle for a new posture. For example, if the measured or target waist angle is 150°, then the second control system 500 may determine, for example, that the base angle should be 25°. The base angle may be determined by the second control system 500 by reference to a look-up table, by calculation according to a formula, or the like. It will be appreciated, therefore, that the second control system 500 serves to keep the robot 100 at approximately a fixed location within the external frame of reference while bending at the waist joint 150, by coordinating the change in the base angle with the change in the waist angle so that the center of gravity is maintained approximately over the axis defined between the wheels 120. In contrast with some systems of the prior art, the base angle may vary while the robot 100 is approximately still. Further, the base angle is a value that is determined by the second control system 500 based on the waist angle, rather than being used as a control mechanism by a user, as in the prior art.

The second control system 500 comprises a base angle determining logic 510 which receives a signal generated by a waist angle input device 520, determines a target base angle, and sends the target base angle to the balance maintaining logic 430 which, in turn, activates the motor 410. In some embodiments, the waist angle input device 520 comprises a waist angle sensor disposed on the robot 100 at the waist joint 150. In these embodiments, the base angle determining logic 510 responds to changes in the waist angle, continuously updating the base angle in response to the waist angle. The waist angle sensor can be, for example, an optical encoder mounted on the axis of the waist joint 150, or a linear potentiometer integrated with the actuator 160. Some embodiments include more than one waist angle sensor configured to operate redundantly.

Figure 7:
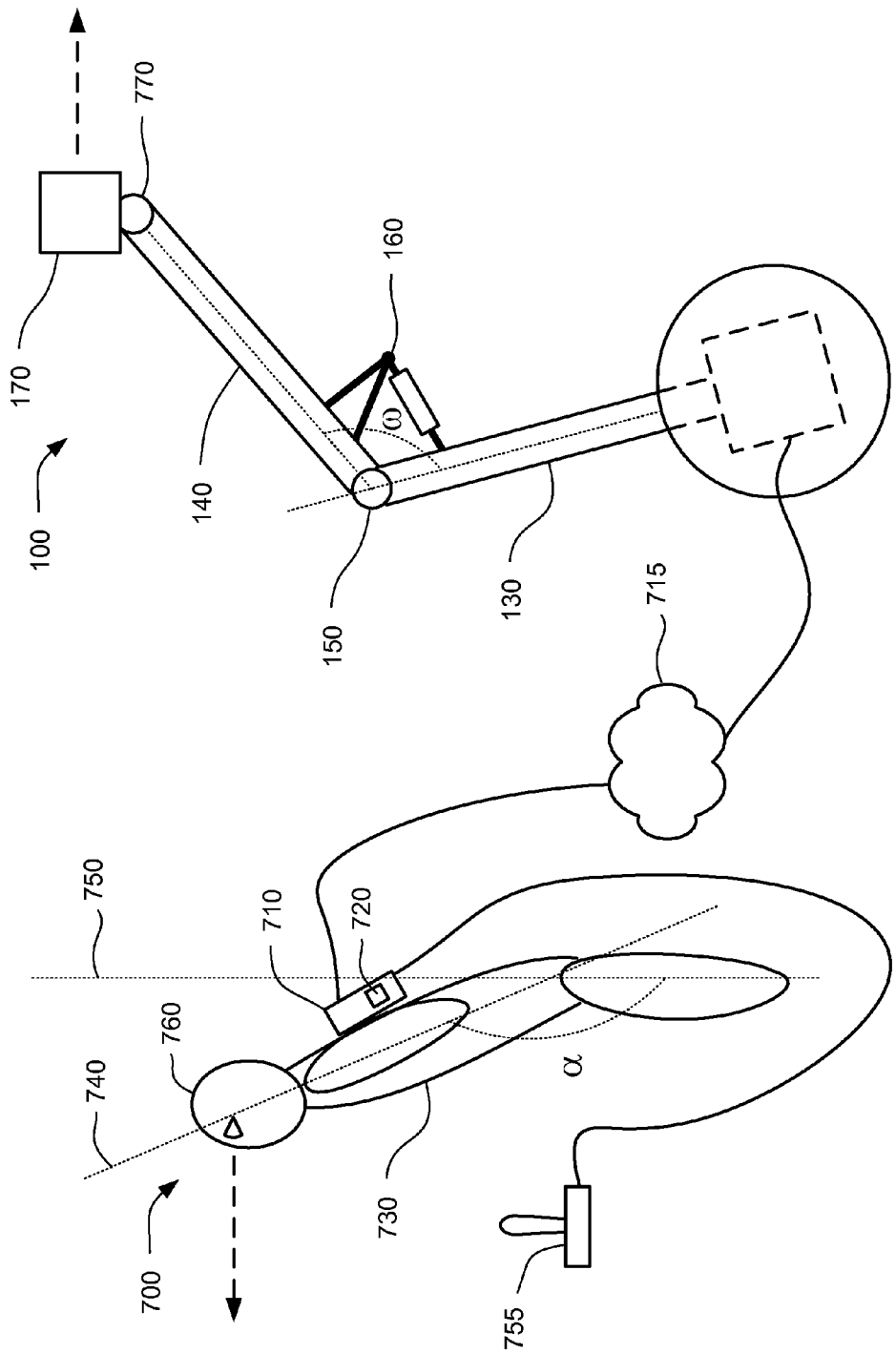
FIG. 7 shows a schematic representation of a person employing a human interface to remotely control the robot of FIGS. 1-3, according to an embodiment of the present invention.

In some embodiments, the waist angle input device 520 comprises an external input device configured to provide a target waist angle to base angle determining logic. For example, waist angle input device 520 may include a joystick, mouse, position sensor, processor, or some other device configured for a user to remotely actuate the actuator 160. Using the waist angle input device 520, an external operator can send a signal to the robot 100 to set the waist angle to a particular angle, or to bend at the waist joint 150 by a certain number of degrees. In these embodiments, the base angle determining logic 510 determines the target base angle for the target waist angle and then provides the target base angle to the balance maintaining logic 430. In some of these embodiments, the balance maintaining logic 430 also receives the signal from the waist angle input device 520 and synchronizes the control of the motor 410 together with the control of the actuator 160. It is noted here that the waist angle input device 520 may comprise logic within the robot 100 itself, in those embodiments where the robot 100 is configured to act autonomously or semi-autonomously. FIG. 7, below, further describes how the waist angle input device 520 can be part of a human interface for controlling the robot 100.

In some embodiments, the base angle determining logic 510 determines the target base angle for a given waist angle by accessing a set of previously determined empirical correlations between the base and waist angles. These empirically determined correlations can be stored in a look-up table or can be represented by a formula, for example. In some embodiments, determining the target base angle for a target waist angle optionally comprises searching the look-up table for the base angle that corresponds to the target waist angle, or interpolating a base angle where the target waist angle falls between two waist angles in the look-up table. In other embodiments, the base angle determining logic 510 comprises base angle calculator configured to calculate the base angle by applying a formula, performing a finite element analysis, or the like.

Figure 6:
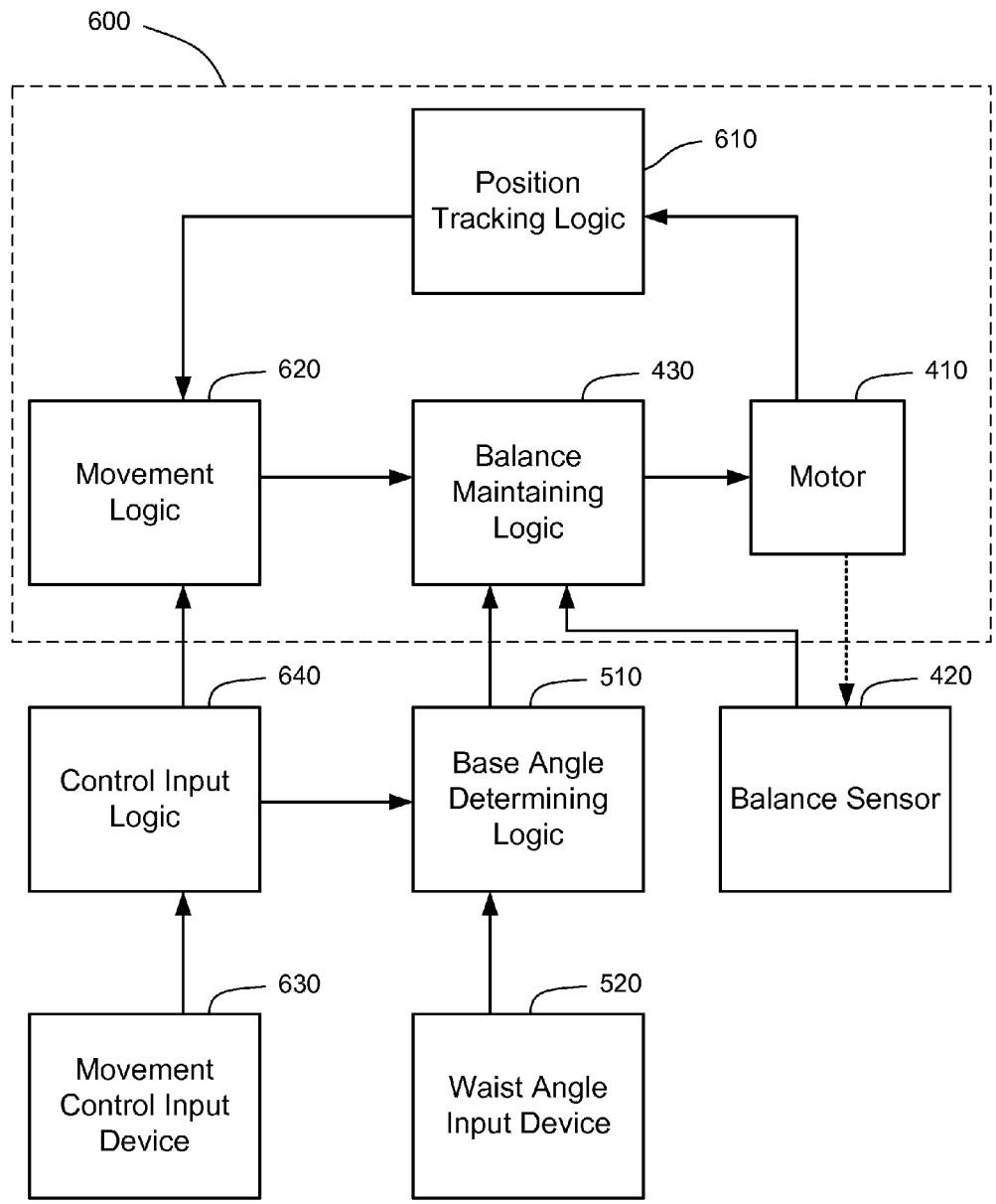
FIG. 6 is a schematic representation of a third control system configured to control the movement of the robot of FIGS. 1-3, according to an embodiment of the present invention.

While such empirically derived data that correlates base angles with waist angles may not take into account factors such as the positions of arms, or weight carried by the robot 100, in most instances such empirical data is sufficient to keep the robot 100 approximately stationary while bending at the waist joint 150. Where the robot 100 does shift location slightly due to such inaccuracy, a third control system, discussed below with respect to FIG. 6, is configured to control the movement of the robot 100 in order to return the robot 100 back to the original location. In alternative embodiments, positions of arms, weight carried, or other factors influencing center of gravity may be taken into account by base angle determining logic 510 when determining the target base angle.

In other embodiments, the base angle determining logic 510 determines the target base angle for a given waist angle by performing a calculation. For example, the overall center of gravity of the robot 100 can be computed so long as the masses and the centers of gravity of the individual components are known (i.e, for the base 110, segments 130 and 140, and head 170) and the spatial relationships of those components are known (i.e., the base and waist angles). Ordinarily, the center of gravity of the robot 100 will be aligned with the vertical axis. Therefore, in response to a change in the waist angle, or in response to an input to change the waist angle, the base angle determining logic 510 can solve for the base angle that will keep the center of gravity of the robot 100 aligned with the vertical axis.

FIG. 6 is a schematic representation of a third control system 600 configured to control the movement of the robot 100 of FIGS. 1-3, according to an embodiment of the present invention. Movement of the robot 100 can comprise rotating the robot 100 around the vertical axis, moving or returning the robot 100 to a particular location, moving the robot 100 in a direction at a particular speed, and executing turns while moving. The third control system 600 comprises position tracking logic 610 configured to track the location and orientation of the robot 100 relative to either the internal or external frame of reference. In some embodiments, the position tracking logic 610 tracks other information by monitoring the rotation of the wheels 120 and/or by monitoring other sources like the balance sensor 420. Examples of other information that can be tracked include the velocity and acceleration of the robot 100, the rate of rotation of the robot 100 around the vertical axis, and so forth.

The position tracking logic 610 can track the location and the orientation of the robot 100, for example, by monitoring the rotations of the wheels 120 and by knowing the circumferences thereof. Location and orientation can also be tracked through the use of range finding equipment such as sonar, radar, and laser-based systems, for instance. Such equipment can be either be part of the robot 100 or external thereto. In the latter case, location and orientation information can be received by the position tracking logic 610 through a wireless communication link. Devices or logic for monitoring wheel rotation, as well as the range finding equipment noted above, comprise examples of position sensors.

The third control system 600 also comprises movement logic 620 configured to receive at least the location information from the position tracking logic 610. The movement logic 620 can compare the received location information against a target location which can be any point within the relevant frame of reference. If the location information received from the position tracking logic 610 is different than the target location, the movement logic 620 directs the balance maintaining logic 430 to move the robot 100 to the target location. Where the target location is fixed while the second control system 500 coordinates a bend at the waist joint 150 with a change in the base angle, the third control system 600 will return the robot 100 to the target location to correct for any inaccuracies in the target base angle.

For the purposes of moving the robot 100 to a new location, the balance maintaining logic 430 has the additional capability to change the base angle so that the robot 100 deviates from balance momentarily to initiate a lean in the intended direction of travel. Then, having established the lean in the direction of travel, the balance maintaining logic 430 controls the motor 410 to apply torque to rotate the wheels 120 in the direction necessary to move in the desired direction. For example, with reference to FIG. 3, to move the robot 100 to the right in the drawing, the balance maintaining logic 430 initially directs the motor 410 to turn the wheels 120 counterclockwise to cause the robot 100 to pitch clockwise. With the center of gravity of the robot 100 to the right of the vertical axis, the balance maintaining logic 430 next turns the wheels 120 clockwise so that the robot 100 rolls to the right.

In some embodiments, the movement logic 620 can also compare orientation information received from the position tracking logic 610 against a target orientation. If there is a difference between the two, the movement logic 620 can instruct the balance maintaining logic 430 to rotate the robot 100 to the target orientation. Here, the balance maintaining logic 430 can control the wheels 120 to counter-rotate by equal amounts to rotate the robot 100 around the vertical axis by the amount necessary to bring the robot 100 to the target orientation. Other information tracked by the position tracking logic 610 can be similarly used by the movement logic 620 and/or components of other control systems.

Target locations and orientations can be determined by the movement logic 620 in a variety of ways. In some embodiments, the movement logic 620 can be programmed to execute moves at particular times or in response to particular signals. In other embodiments, the robot 100 is configured to act autonomously, and in these embodiments the robot 100 comprises autonomous logic configured to update the movement logic 620 as needed with new location and orientation targets. The movement logic 620 can also be configured, in some embodiments, to receive location and orientation targets from a human interface, such as described below with respect to FIG. 7.

In some embodiments, the robot 100 also comprises a control input logic 640 configured to receive movement control signals from a movement control input device 630. Control input logic 640 may be further configured to calculate a target location or velocity based on these signals, and to communicate the target location or velocity to the movement logic 620. Movement control input device 630 may comprise a joystick, mouse, position sensor, processor, or some other device configured for a user to indicate a target location or movement.

FIG. 7 shows a schematic representation of a person 700 employing a human interface to remotely control the robot 100 of FIGS. 1-3, according to an embodiment of the present invention. The human interface comprises a controller 710 that can be disposed, in some embodiments, within a backpack or a harness or some other means configured to be positioned on the body of the person 700. The controller 710 can also be carried by the person or situated remotely from the person 700. The controller 710 is optionally an example of waist angle input device 520 and or movement control input device 630.

With reference to FIG. 6, the controller 710 provides control signals to the base angle determining logic 510 and/or the control input logic 640. These control signals may be configured to provide a new target position and/or a new target waist angle. The controller 710 can be connected to the robot 100 through a network 715, in some embodiments. The network 715 can be an Ethernet, a local area network, a wide area network, the Internet, or the like. The connections to the network 715 from both or either of the controller 710 and robot 100 can be wired or wireless connections. In further embodiments the controller 710 and the robot 100 are in direct communication, either wired or wirelessly, without the network 715. In some embodiments, the robot 100 transmits signals and/or data back along the communication path to the controller 710 or other logic configured to operate the human interface to provide, for example, video, audio, and/or tactile feedback to the person 700.

The controller 710 comprises one or more sensors and/or detectors such as a position sensor 720 configured to detect an angle, a, of a torso 730 of the person 700. Here, the angle of the torso 730 is an angle made between a longitudinal axis 740 of the torso 730 and a vertical axis 750. More specifically, when the person 700 is standing erect, the angle of the torso 730 is about zero and increases as the person 700 bends at the waist, as illustrated. The position sensor 720 can make this measurement, for example, through the use of accelerometers and/or gyroscopes positioned on the back of the person 700.

It will be understood, of course, that the human torso does not have a precisely defined longitudinal axis, so the longitudinal axis 740 here is defined by the orientation of the position sensor 720 with respect to the external frame of reference. More generally, just as the base angle is defined by two reference planes, one fixed to the base 110 and one fixed to the external frame of reference, the longitudinal axis 740 is fixed to the torso 730 and the vertical axis 750 is fixed to the external frame of reference. And just as in the case of the base angle, these axes 740, 750 can be arbitrarily fixed. The longitudinal axis 740 and the vertical axis 750 are merely used herein as they are convenient for the purposes of illustration.

As noted, the controller 710 can also comprise other sensors and/or detectors to measure other aspects of the person 700, such as the orientation of the person's head 760, where the person is looking, location and motion of the person's arms, the person's location and orientation within a frame of reference, and so forth. For simplicity, other sensors and detectors have been omitted from FIG. 7, but it will be appreciated that the controller 710 can support many such other sensors and detectors in a manner analogous to that described herein with respect to the position sensor 720. In some embodiments, the controller 710 and the position sensor 720, and/or other sensors and detectors, are integrated into a single device. In other embodiments, such as those embodiments in which the controller 710 is situated off of the body of the person 700, the controller 710 may communicate with the position sensor 720, for instance, over a wireless network.

The controller 710 optionally provides movement control signals from which the control input logic 640 can calculate a target location, for example. The movement control signals can be derived from measurements acquired from sensors and detectors configured to measure various aspects of the person 700. Other movement control signals provided by the controller 710 may also be derived from a movement control input device 630 such as a joystick 755. In still other embodiments, any of the sensors, detectors, and control input devices 630 can bypass the controller 710 and communicate directly to the control input logic 640 or the base angle determining logic 510.

As an example, the controller 710 can determine the angle of the torso 730 from the position sensor 720 and provide a control input signal derived from the angle of the torso 730 to the control input logic 640. In some embodiments, the control input signal comprises a target waist angle for the robot 100, determined by the controller 710, while in other embodiments the control input signal simply comprises the angle of the torso 730, and in these embodiments the control input logic 640 determines the target waist angle. Next, the control input logic 640 provides the target waist angle to the base angle determining logic 510 to determine the target base angle, and provides the target waist angle to the movement logic 620, or to the balance maintaining logic 430, to control the actuator 160.

As noted, either the controller 710 or the control input logic 640 can determine the target waist angle from the angle of the torso 730, in various embodiments. In some embodiments, this determination is performed by setting the target waist angle equal to the angle of the torso 730. In this way the waist angle of the robot 100 emulates the angle of the person's torso 730. Other embodiments are intended to accentuate or attenuate the movements of the person 700 when translated into movements of the robot 100, as discussed below.

As shown in FIG. 7, the angle of the torso 730 of the person 700 is less than the waist angle of the robot 100 to illustrate embodiments in which the person 700 bends at the waist and the degree of bending is accentuated so that the robot 700 bends further, or through a greater angle, than the person 700. Here, the target waist angle is determined by the controller 710, or the control input logic 640, to be greater than the angle of the torso 730. The target waist angle can be derived, for example, from a mathematical function of the angle of the torso 730, such as a scaling factor. In other embodiments, a look-up table includes particular waist angles of the robot 100 for successive increments of the angle of the torso 730. In these embodiments, deriving the target waist angle of the robot 100 from the angle of the torso 730 comprises finding in the look-up table the waist angle of the robot 100 for the particular angle of the torso 730, or interpolating a waist angle between two waist angles in the look-up table.

Just as the angle of the torso 730 can be used to control the waist angle of the robot 100, in some embodiments the head 760 of the person 700 can be used to control the head 170 of the robot 100. For example, the controller 710 can comprise one or more sensors (not shown) configured to monitor the orientation of the head 760 of the person 700, including tilting up or down, tilting to the left or right, and rotation around the neck (essentially, rotations around three perpendicular axes). In some embodiments, the direction in which the eyes of the person 700 are looking can also be monitored. The controller 710 can use such sensor data, in some embodiments, to derive a target orientation of the head 170 to transmit as a control input signal to the control input logic 640. In other embodiments, the controller 710 transmits the data from the sensors as the control input signal to the control input logic 640, and then the control input logic 640 derives the target orientation of the head 170.

In some embodiments, the controller 710 or control input logic 640 is configured to keep the orientation of the head 170 of the robot 100 equal to that of the head 760 of the person 700, each with respect to the local external frame of reference. In other words, if the person 700 tilts her head forward or back by an angle, the head 170 of the robot 100 tilts forward or back by the same angle around a neck joint 770. Likewise, tilting to the left or right and rotation around the neck (sometimes referred to as panning) can be the same for both the head 760 of the person 700 and the head 170 of the robot 100, in various embodiments. In some embodiments, the neck joint 770 is limited to panning and tilting forward and back, but not tilting to the left and right.

In further embodiments, keeping the orientation of the head 170 of the robot 100 equal to that of the head 760 of the person 700 can comprise tilting the head 170 of the robot 100 through a greater or lesser angle than the head 760 of the person. In FIG. 7, for example, where the person 700 bends at the waist through an angle and the robot 100 is configured to bend at the waist joint 150 through a greater angle, the head 760 of the robot 100 nevertheless can remain oriented such that stereo cameras (not shown) in the head 170 have a level line of sight to match that of the person 700. Here, the head 170 of the robot 100 tilts back through a greater angle than the head 760 of the person 700 to compensate for the greater bending at the waist joint 150.

Figure 8:
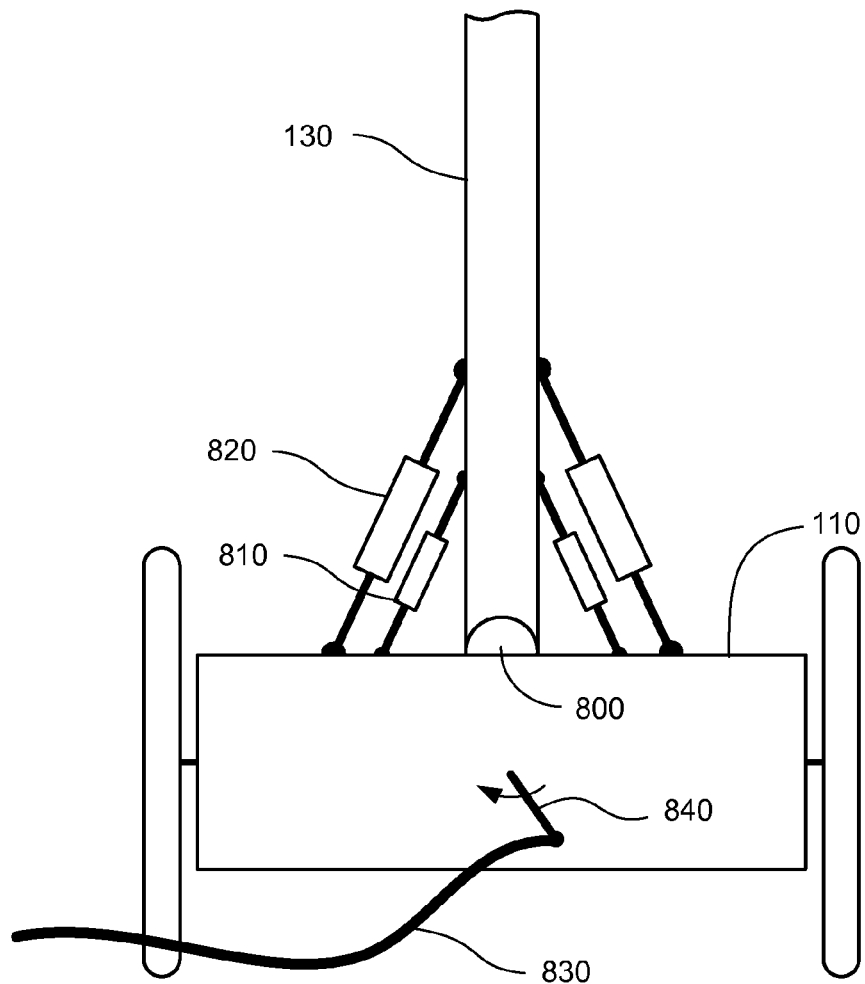
FIG. 8 shows the robot of FIGS. 1-3 further comprising a lean joint, according to an embodiment of the present invention.

FIG. 8 shows the robot 100 of FIGS. 1-3 further comprising a lean joint 800, according to an embodiment of the present invention. The lean joint 800 can be disposed along the leg segment 130 near the base 110, while in other embodiments the lean joint couples the leg segment 130 to the base 110 as illustrated by FIG. 8. The lean joint 800 permits rotation of the leg segment 130 around the horizontal axis relative to the base 110. In other words, the lean joint 800 permits tilting of the leg segment 130 in a direction that is perpendicular to the movement of the torso segment 140 enabled by the waist joint 150. This can permit the robot 100 to traverse uneven or non-level surfaces, react to forces that are parallel to the transverse axis, lean into turns, and so forth. Here, the control logic described with respect to FIGS. 4-6, or analogous control logic, can keep the leg segment generally aligned with the Y-Z plane while the base 110 tilts relative to this plane due to a sloped or uneven surface. In some embodiments, such control logic can control the leg segment 130 to lean into turns.

In various embodiments, the robot 100 includes one or more stabilizers 810, such as springs or gas-filled shock-absorbers for example, configured to restore the leg segment 130 to an orientation perpendicular to the base 110. In further embodiments, the robot 100 additionally comprises, or alternatively comprises, one or more actuators 820 configured to move the leg segment 130 around the lean joint 800 relative to the base 110. The balance maintaining logic 430, in some embodiments, receives information from the balance sensor 420 regarding tilting around the transverse axis and controls the actuator 820 to counteract the tilt. In some embodiments, the one or more actuators 820 comprise hydraulic or pneumatic cylinders. It will be understood that one or more stabilizers can also be analogously employed at the waist joint 150 in conjunction with the actuator 160.

FIG. 8 also illustrates an optional tether 830 extending from the base 110. The tether can be used to provide communications, power, and/or compressed air for pneumatics to the robot 100. Those embodiments that include the tether 830 may optionally also include an actuated tail 840 extending outward from the base and coupling the tether 830 to the base 110. The tail 840, when actuated, rotates around a pivot point in order to move the tether 830 out of the way of the wheels 120 when the robot 100 is driven backwards.

Figure 9:
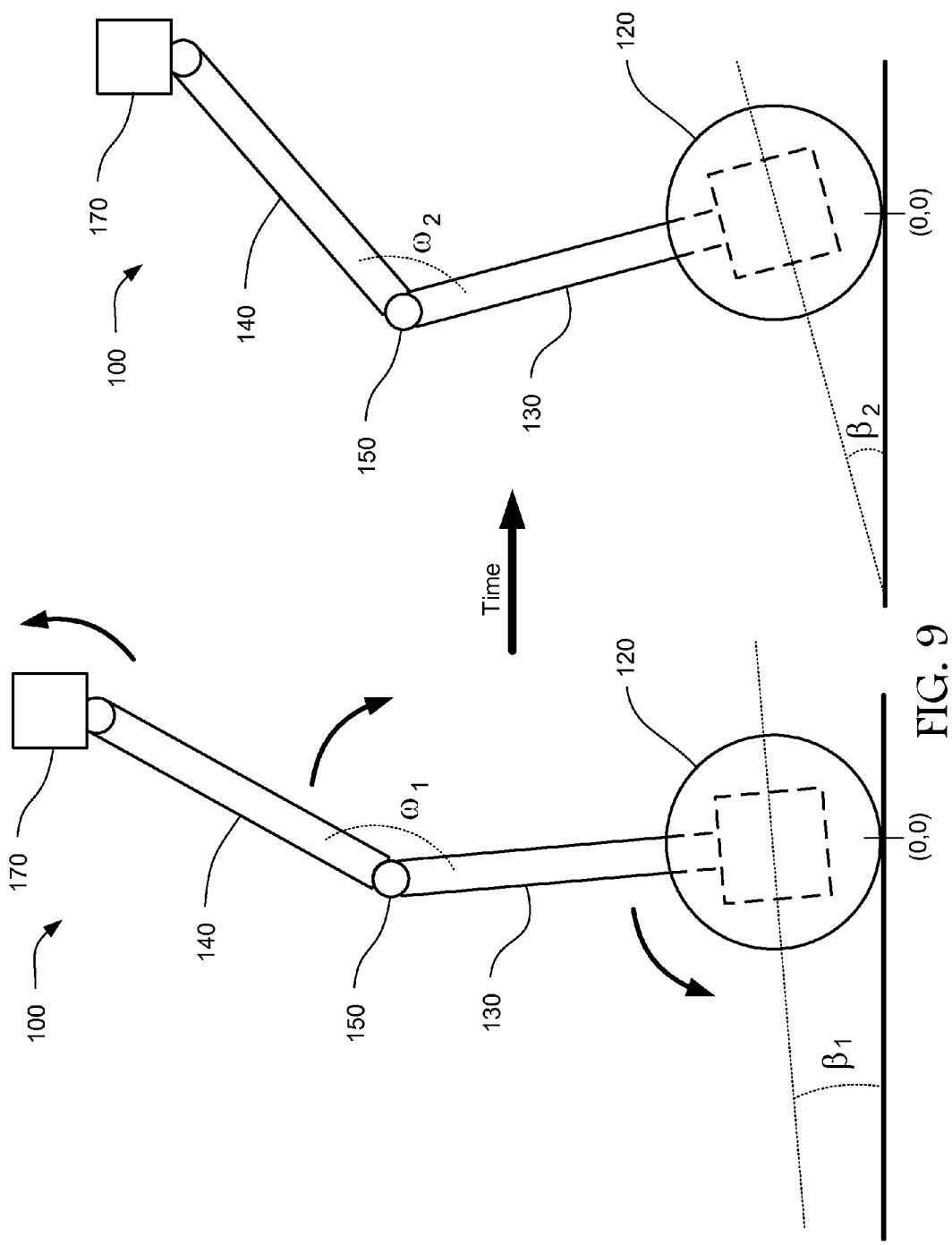
FIG. 9 graphically illustrates a method according to an embodiment of the present invention.

FIG. 9 graphically illustrates a method according to an embodiment of the present invention. According to the method, the robot 100 maintains balance on two wheels and maintains a location within the external frame of reference while bending at the waist joint 150. FIG. 9 shows the robot 100 configured according to a first posture at a time 1 and configured according to a second posture at a later time 2. At time 1 the robot 100 is configured with a first waist angle, $\omega_1$, and a first base angle, $\beta_1$, and at time 2 the robot 100 is configured with a second waist angle, $\omega_2$, and a second base angle, $\beta_2$. As indicated in FIG. 9, the robot 100 at time 1 is at a location in the external frame of reference given the coordinates (0, 0) remains at the location until time 2.

Balance of the robot 100 on two wheels can be maintained by a feedback loop. For example, when a change in a base angle of the robot 100 is measured, the wheels 120 are rotated to correct for the change so that the base angle is maintained and the wheels 120 stay approximately centered beneath the center of gravity of the robot 100.

Bending is accomplished over the interval from time 1 to time 2 by changing the base angle while changing the waist angle such that the wheels do not appreciably rotate. As indicated in FIG. 9, changing the base angle comprises rotating the base around an axis of the wheels 120, and changing the waist angle comprises rotating the torso segment around the waist joint 150 relative to the leg segment 130.

Here, changing the base angle while changing the waist angle such that the wheels do not appreciably rotate includes embodiments where the waist angle and the base angle change continuously over the same period of time and embodiments where changing the angles is performed in alternating increments between incremental changes in the waist angle and incremental changes in the base angle. In these embodiments, the robot 100 is capable of transitioning between postures without the wheels 120 appreciably rotating, in other words, without the robot 100 rolling forward and back. "Appreciably" here means that slight deviations back and forth can be tolerated to the extent that the robot 100 provides the necessary level of stability for an intended purpose, such as a robot 100 operated by telepresence.

In embodiments that employ a motor 410 configured to rotate the wheels 120, changing the base angle while changing the waist angle can be accomplished by balancing the torque applied by the motor 410 against the torque applied to the wheels 120 by the shift in the center of gravity due to the changing waist angle. The second control system 500 can be employed to change the base angle while changing the waist angle, but it will be understood that the control system 500 is merely one example of a computer-implemented control suitable for performing this function.

Methods illustrated generally by FIG. 9 can further comprise receiving a target waist angle. For example, the base angle determining logic 510 can receive the target waist angle from autonomous logic of the robot 100, or from a human interface such as controller 710. In some embodiments, changing the base angle includes determining a target base angle from the target waist angle such as with the base angle determining logic 510. In some of these embodiments, determining the target base angle from the target waist angle includes searching a database for the base angle that corresponds to the target waist angle. In other instances the target base angle is calculated based on the target waist angle.

Methods illustrated generally by FIG. 9 can further comprise either changing an orientation of the head 170 of the robot 100, or maintaining a fixed orientation of the head 170, while changing the waist angle. As noted above, changing the orientation of the head 170 can be accomplished in some embodiments by monitoring the orientation of the head 760 of the person 700, and in further embodiments, the direction in which the eyes of the person 700 are looking. Here, the orientation of the head 170 can follow the orientation of the head 760 of the person 700, for example.

The method can comprise deriving an orientation of the head 170 from the sensor data with the controller 710 and then transmitting the target orientation as a control input signal to the control input logic 640. Other embodiments comprise transmitting the sensor data as the control input signal to the control input logic 640, and then deriving the target orientation of the head 170 with the control input logic 640. Regardless of how the orientation of the head 170 is derived, the target orientation can be achieved through rotating the head 170 around a neck joint 770 relative to the torso segment 140. In some embodiments, as shown in FIG. 9, the rotation is around an axis, disposed through the neck joint 770, that is parallel to the transverse axis. Additional rotations around the other two perpendicular axes can also be performed in further embodiments.

Some embodiments further comprise maintaining a fixed orientation of the head 170 while changing the waist angle. Here, one way in that the target orientation can be maintained is by a feedback loop based on a visual field as observed by one or more video cameras disposed in the head 170. If the visual field drifts up or down, the head 170 can be rotated around an axis of the neck joint 770 in order to hold the visual field steady.

Figure 10:
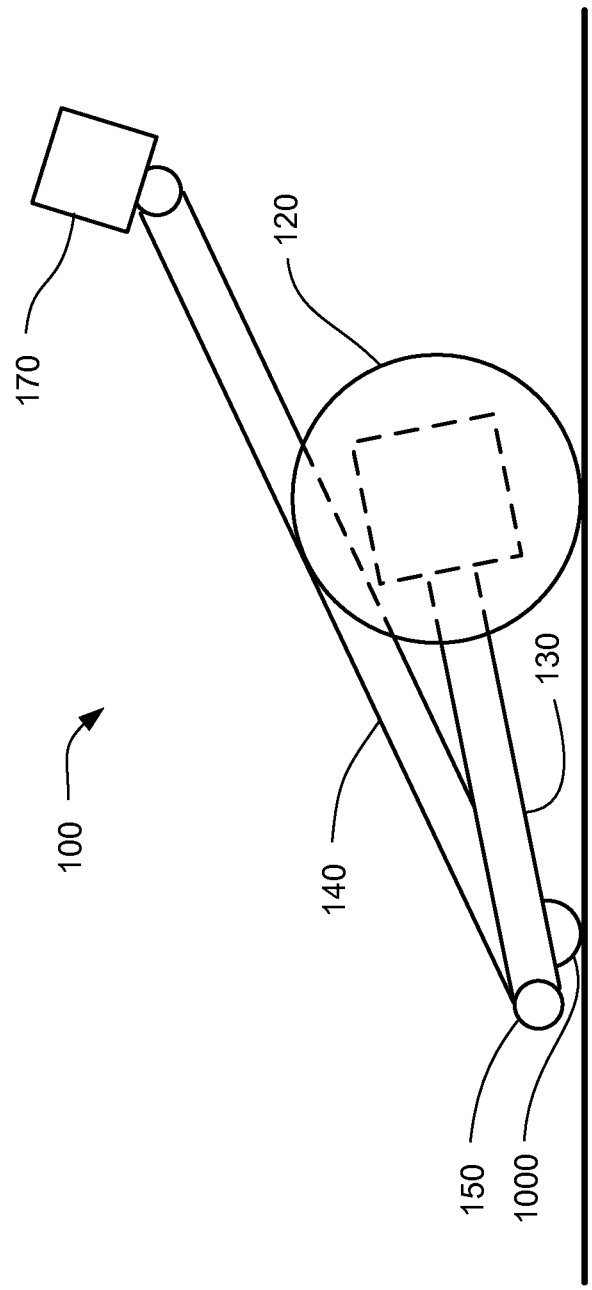
FIG. 10 shows the robot of FIGS. 1-3 in a sitting posture according to an embodiment of the present invention.

FIG. 10 shows the robot 100 in a sitting posture according to an embodiment of the present invention. The sitting posture can be used, for example, as a resting state when the robot 100 is not in use. The sitting posture is also more compact for transportation and storage. In some embodiments, the leg segment 130 includes a bumper 1000 for making contact with the ground when the robot 100 is sitting. It can be seen that the sitting posture of FIG. 10 can be achieved by continuing the progression illustrated by FIG. 9. In some instances, the robot 100 will not be able to bend at the waist joint 150 all of the way to the sitting posture, but can come close, for example, by bringing the bumper 1000 to about 6 inches off of the ground. From this position, the robot 100 can safely drop the remaining distance to the ground. To bring the robot 100 to a standing posture from the sitting posture shown in FIG. 10, a sudden torque is applied by the motor to the wheels 120 and as the center of gravity moves over the center of the wheels 120 the actuator 160 begins to increase the waist angle and the robot 100 begin to balance, as described above.

As provided above, in these embodiments the center of gravity of the torso segment 140 should also be as close to the head 170 as possible, and the center of gravity of the leg segment 130 should additionally be as close to the wheels 120 as possible. Towards this goal, the length of the torso segment 140 can be longer than the length of the leg segment 130. The length of the torso segment 140 is shown to be longer in FIG. 10 than in preceding drawings to illustrate this point. In some instances, the center of gravity of the combined body segments above the waist joint 150, such as the torso segment 140 and head 170, is further than half their overall length from the waist joint 150.

Figure 11:
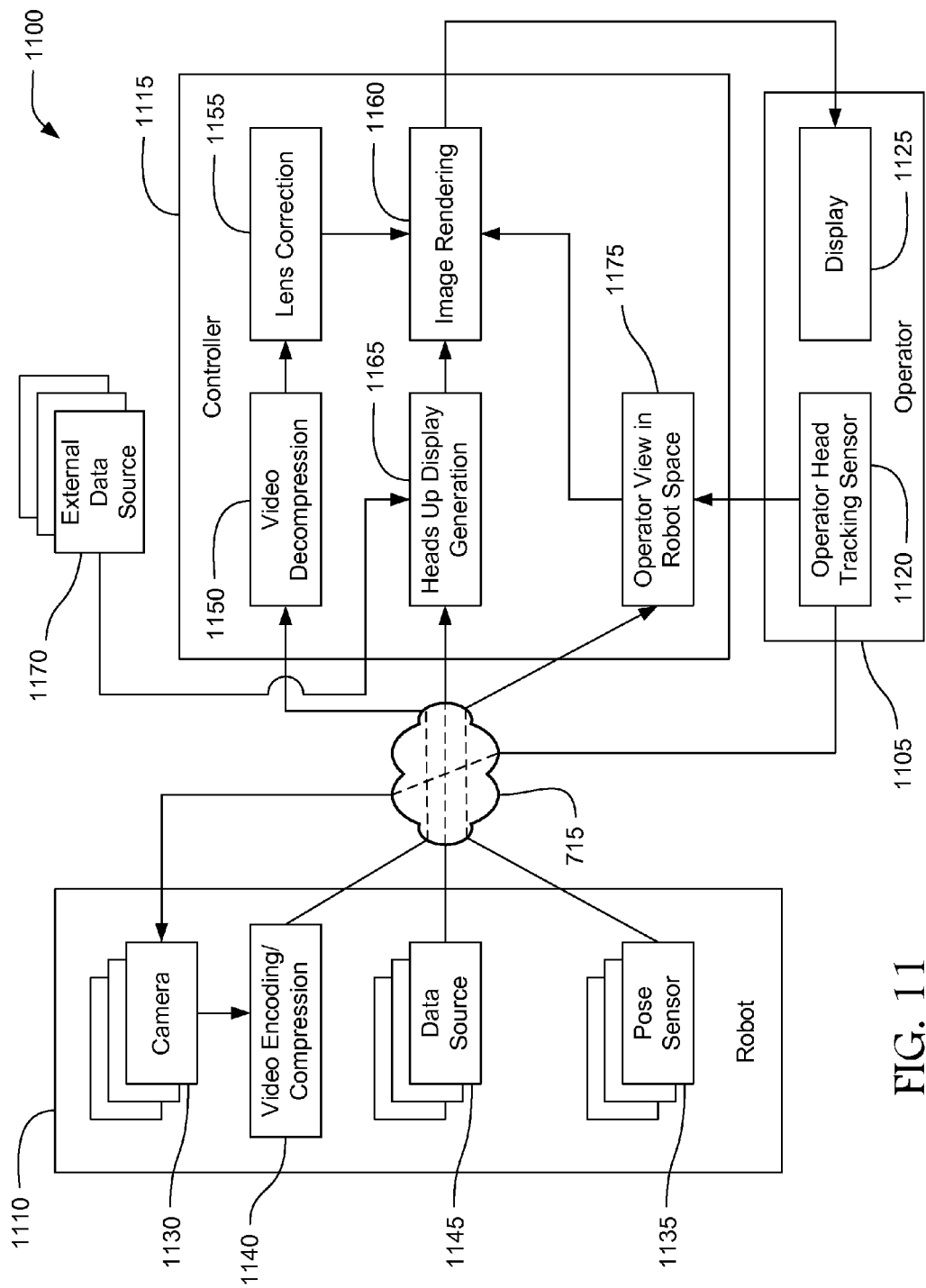
FIG. 11 shows a block diagram representation of a robotic system for providing visual telepresence to an operator according to an embodiment of the present invention.

FIG. 11 shows a block diagram representation of a robotic system 1100 for providing visual telepresence to an operator 1105 according to an embodiment of the present invention. The system 1100 comprises a robot 1110, a controller 1115, such as a processor, an optional head-tracking sensor 1120 configured to track the orientation of the head the operator 1105, and a display 1125 configured to provide an image of the robot's visual environment to the operator 1105. The robot 1110 can be in direct communication with the controller 1115, or can be in communication across a network 715 (FIG. 7) as shown in FIG. 11. The network 715 can comprise an Ethernet, a local area network, a wide area network, the Internet, or the like. The head-tracking sensor 1120 and the display 1125 can each be in direct communication with the controller 1115, as shown, or in communication through a network. In some embodiments, the controller 1115 is integral with other controllers that comprise the human interface, such as controller 710 (FIG. 7).

The head-tracking sensor 1120 can comprise a magnetic compass or a set of rate gyros, for example. In various embodiments, the display 1125 can be a video monitor, such as that of a work station, or an image projection system of a head-mounted display, for example. In those embodiments in which the display 1125 comprises the image projection system of a head-mounted display, the head-tracking sensor 1120 and the display 1125 can be integrated into the same head-mounted display. In some instances, more than one display 1125 can be employed, for example, one display 1125 can be part of a head-mounted display worn by the operator 1105 and another display 1125 can be provided as a video screen for observers.

The robot 1110 is not limited to self-balancing robots such as robot 100 (e.g., FIGS. 1-3), but can include any robot, whether mobile or fixed at a location, that includes a plurality of video cameras 1130. In some embodiments, such as those embodiments in which the robot 1110 is characterized by a generally human-like upright posture, at least two of the video cameras 1130 are disposed on a head of the robot 1110 (e.g. head 170) and arranged so as to provide a stereoscopic view. The placement of video cameras 1130 is discussed in greater detail with respect to FIG. 12. Embodiments of the robot 1110 can include pose sensors 1135 which are devices that are configured to provide data from which the spatial location and aim of the video cameras 1130 relative to a frame of reference can be calculated. Accordingly, pose sensors can 1135 can provide data concerning the angles of the joints of the robot 1110, such as that of the waist joint 150 (FIG. 1) or the lean joint 800 (FIG. 8). Other pose sensors 1135 can be configured to measure other characteristics of the robot 1110, such as rotational attributes like the amount of, or the rate of change of, pitch, roll and yaw. Pose sensors 1135 can comprise, in various embodiments, an inertial measurement unit (IMU), optical encoders and/or linear potentiometers.

The robot 1110 can optionally include logic 1140 for performing video encoding and compression of the signals produced by the video cameras 1130. The robot 1110 can optionally also include one or more data sources 1145. Examples of data sources 1145 include such devices as microphones, a global positioning receiver, and environmental sensors such as for temperature, atmospheric sampling, radiation monitoring, etc.

In some embodiments the head-tracking sensor 1120 provides signals regarding the orientation of the head of the operator 1105, and these signals are used to aim the video cameras 1130, for example, by changing the posture of the robot 1110 by rotating the head of the robot 1110 and/or by bending the robot 1110 at one or more joints. In some embodiments, the video cameras 1130 are movably mounted to the robot 1110 so that the video cameras 1130 can be aimed without moving the robot 1110. Control over the aiming of the video cameras 1130, according to the orientation of the head of the operator 1105 determined by the head-tracking sensor 1120, can be performed by a controller such as controller 710 (FIG. 7) or the logic described above with respect to the control systems 400-600 of the robot 100. For clarity, this controller has been omitted from FIG. 11.

Figure 12:
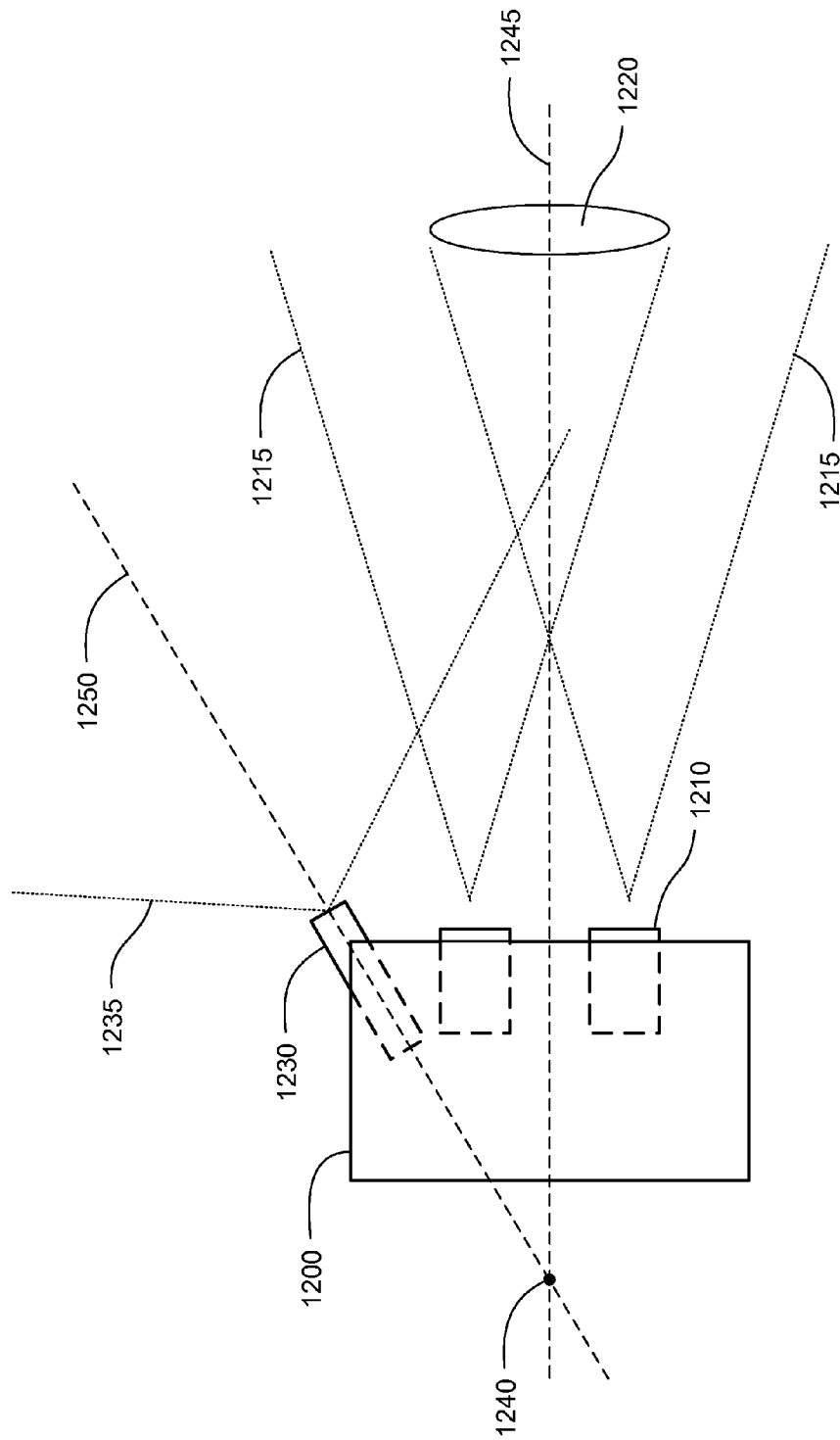
FIG. 12 shows a schematic representation of a top view of a head of a robot to illustrate camera placement therein according to an embodiment of the present invention.

FIG. 12 shows a schematic representation of a top view of a head 1200 of the robot 1110 to illustrate the placement of video cameras 1130 according to an embodiment of the present invention. The video cameras 1130, in the embodiment illustrated by FIG. 12, comprise a pair of stereo cameras 1210 configured to aim approximately in the same direction. The fields of view 1215 of the stereo cameras 1210 overlap to form a common field of view 1220 that in some embodiments can be presented to the operator 1105 as a stereo image of the visual environment of the robot 1110. In various embodiments, the stereo cameras 1210 can comprise high resolution cameras, for example, high-definition (HD) cameras.

The video cameras 1130 also comprise at least one peripheral camera 1230 configured to aim in a direction different than that of the pair of stereo cameras 1210, but with a field of view 1235 that at least partially overlaps the field of view 1215 of at least one of the stereo cameras 1210. For simplicity, FIG. 12 only shows one such peripheral camera 1230, however, it will be appreciated that some embodiments include sufficient peripheral cameras 1230 such that their overlapping fields of view 1215, 1235 of the set of video cameras 1130 encompass an entire 360° field of view. One or more of the peripheral cameras 1230 can include, for example, an omni-lens, a fish eye lens, or a telephoto lens.

It will be understood that the term "stereo camera" as used herein is not meant to imply that a single stereo camera 1210 is capable of producing a stereo image, but rather that the pair of stereo cameras 1210 can be employed together to produce stereo images. While the cameras 1210 and 1230 are differentiated herein as being either "stereo" or "peripheral," it should be understood that the same type of video camera can be employed for both, in some embodiments. In other embodiments, stereo cameras 1210 and peripheral cameras 1230 can be different types of cameras. For instance, the fields of view 1235 of the peripheral cameras 1230, in some embodiments, are wider than the fields of view 1215 of the stereo cameras 1210. Likewise, in some embodiments the peripheral cameras 1230 are characterized by lower resolutions than the stereo cameras 1210.

As noted above, a field of view 1235 of a peripheral camera 1230 at least partially overlaps the field of view 1215 of at least one of the stereo cameras 1210. It should be noted, however, that not every peripheral camera 1230 is required to have a field of view 1235 that overlaps with a field of view 1215 of a stereo camera 1210, so long as at least one peripheral camera 1230 has a field of view 1235 that overlaps in this manner. Although not illustrated, in various embodiments peripheral cameras 1230 can be aimed in the direction opposite to the direction that of the pair of stereo cameras 1210 is aimed, as well as at arbitrary angles to the direction that of the pair of stereo cameras 1210 is aimed, such as 30°, 45°, 60°, 90, 120°, 135°, and 150°.

The video cameras 1210 and 1230 can be mounted internally to the head 1200 as shown in FIG. 12, external to the head 1200, or some can be mounted internally while some are mounted externally. It should be understood that the video cameras 1130 need not be mounted on the head 1200 of the robot 1110, and in some embodiments the video cameras 1130 are attached to the robot 1110 in other ways, such as by being supported on a boom extending from the robot 1110. It will also be appreciated that the video cameras 1130 do not need to all be fixed to the same part of the robot 1110. For instance, some video cameras 1130 can be attached to the head 1200 of the robot 1110, while another video camera 1130 can be attached to the torso segment 140.

In order to simplify the process of stitching together the various video signals received from the several video cameras 1130 to produce a composite video signal from which an image can be rendered to the display 1125, the video cameras 1130 are optionally arranged around a common reference point 1240. In other words, a centerline 1245 of the common field of view 1220 should intersect the centerlines 1250 of the fields of view 1235 of the peripheral cameras 1230. This reference point 1140, where the centerlines 1245, 1250 of the fields of view 1220, 1235 converge, is the point from which the controller 1115 renders the visual environment. It will be appreciated that although the reference point 1240 in FIG. 12 is represented as being exterior to the head 1200, the reference point 1240 can also be interior to the head 1220. Also, it will be understood that the cameras 1130 are not required be arranged such that all centerlines 1245, 1250 are coplanar, as illustrated in FIG. 12, rather, some cameras 1130 can have centerlines 1245, 1250 that are not coplanar with the other cameras 1130. More generally, in some embodiments the cameras 1130 are arranged such that the cameras 1130 are approximately confocal.

Returning to FIG. 11, the controller 1115 comprises logic that renders an image to the display 1125. The logic of the controller 1115 optionally includes video decompression logic 1150 configured to decompress the compressed video signals received from the video encoding and compression logic 1140 of the robot 1110. In those embodiments in which the video signals from the video cameras 1130 are not compressed, the decompression logic 1150 is not required.

The logic of the controller 1115 also can include lens correction logic 1155. The lens correction logic 1155 is configured to receive the decompressed video signals from the decompression logic 1150 and remove image distortions such as those distortions due to lens curvature to produce corrected video signals from each of the video cameras 1130. The corrected video signals are then provided to image rendering logic 1160 of the controller 1115, discussed below. In those embodiments in which the controller 1115 does not include lens correction logic 1155, video decompression logic 1150 provides decompressed uncorrected video signals to the image rendering logic 1160. In those embodiments in which the controller 1115 does not include either of the lens correction logic 1155 or the decompression logic 1150, uncompressed and uncorrected video signals are received by the image rendering logic 1160 from the video cameras 1130. Lens distortion is discussed in detail in "A Flexible New Technique for Camera Calibration" by Zhengyou Zhang, Technical Report MSR-TR-98-71, Microsoft Corporation, Redmond, Wash., December 1998, incorporated herein by reference. Methods for lens correction are described in detail in U.S. Pat. No. 6,002,525, issued to Richard J. Poulo et al., which is also incorporated herein by reference.

The logic of the controller 1115 also can include heads up display generation logic 1165, in some embodiments. In these embodiments, data from data sources 1145 and/or from one or more external data sources 1170 that are external to the robot 1110 is received and transformed into a heads up display. Examples of external data sources 1170 include cameras that are disposed external to the robot 1110. The heads up display can include, in various embodiments, maps, widgets such as on-screen menus, alternate camera views, and information from sensors and instruments such as from a speedometer, an odometer, and temperature sensors, for example. The heads up display, in some embodiments, provides a dashboard-style representation to represent such information. The heads up display produced by the heads up display generation logic 1165 is also provided to the image rendering logic 1160.

The logic of the controller 1115 also includes operator view in robot space generation logic 1175. Logic 1175 is configured to receive signals from the pose sensors 1135 and, in some embodiments, also from the head-tracking sensor 1120 to generate an operator view. The logic 1175 passes the operator view to the image rendering logic 1160 which employs the operator view to determine a portion of the video signals from the video cameras 1130 that will be rendered as an image to the display 1125.

In order to generate the operator view, the logic 1175 defines a robot space and an operator space. The robot space is defined as having a frame of reference fixed to the robot 1110, such as to a location in the head 1200 of the robot 1110. The logic 1175 is configured with information for each video camera 1130 such as the spatial coordinates that define the camera's position and aim in real space relative to the frame of reference fixed to the robot 1110. Such information can also comprise the properties of the camera's lens (e.g., wide or narrow angle) that together with the spatial coordinates defines a field of view of the video camera 1130 in real space, such as the fields of view 1215 and 1235, and similarly defines the corresponding view for the video camera 1130 relative to the same frame of reference within the robot space.

As used herein, a field of view 1215, 1235 of a video camera 1130 is a representation of that portion of the robot's visual environment that is received by the video camera 1130. As used herein, a view in a virtual space, such as the robot space, is a representation of a hypothetical projection of the video signal from a point in the virtual space onto a screen at some distance from that point. Since the logic 1175 is configured with the information noted above, the logic 1175 is able to construct views in the robot space that have the same spatial relationships as the fields of view 1215, 1235 of the video cameras 1130. Accordingly, where fields of view such as 1215 and 1235 overlap in real space, the corresponding views of the video cameras 1130 in the robot space also overlap.

Figure 13:
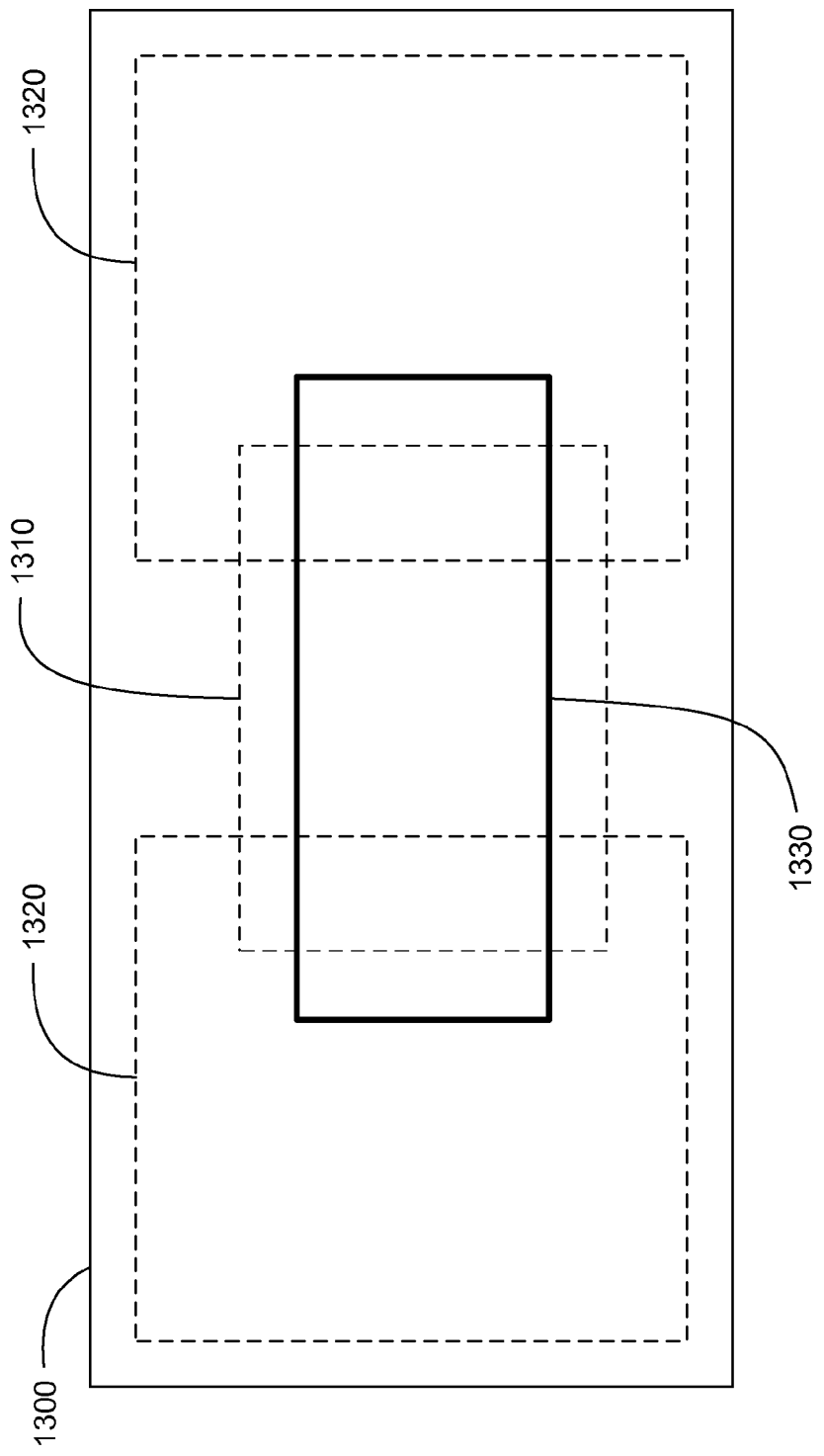
FIG. 13 shows a flattened representation of an operator view superimposed over a robot view comprising a stereo view and peripheral views according to an embodiment of the present invention.

FIG. 13 shows a flattened representation of a robot view 1300 comprising a stereo view 1310 corresponding to the stereo field of view 1220 of the video cameras 1210 and peripheral views 1320 corresponding to the fields of view 1235 of peripheral cameras 1230 according to an embodiment of the present invention. The stereo view 1310 corresponds to the field of view 1220 of the video cameras 1210 as if projected onto a screen at some distance in robot space. Likewise, each peripheral view 1320 corresponds to the field of view 1235 of a peripheral video camera 1230. The robot view 1300 can also comprise other views omitted from FIG. 13 for clarity, such as the views corresponding to the individual fields of view 1215 of the individual video cameras 1210.

Additionally, the logic 1175 defines an operator space including an operator frame of reference to represent the perspective of the operator 1105. An operator view is fixed relative to the operator frame of reference. The operator view represents the portion of the robot view 1300 that the image rendering logic 1160 will ultimately provide to the display 1125. The operator frame of reference is defined relative to the robot frame of reference, for example, in the case of the robot 100, at a height above the center of the base 110. In those embodiments in which the logic 1175 is configured to receive signals from the head-tracking sensor 1120, the orientation of the operator frame of reference relative to the robot frame of reference can vary according to the signals from the head-tracking sensor 1120 such that the orientation of the operator frame of reference follows the orientation of the head of the operator 1105. Because the relationship between the two frames of reference is known, the logic 1175 can define a first transformation between the robot frame of reference and the operator frame of reference.

Figure 14:
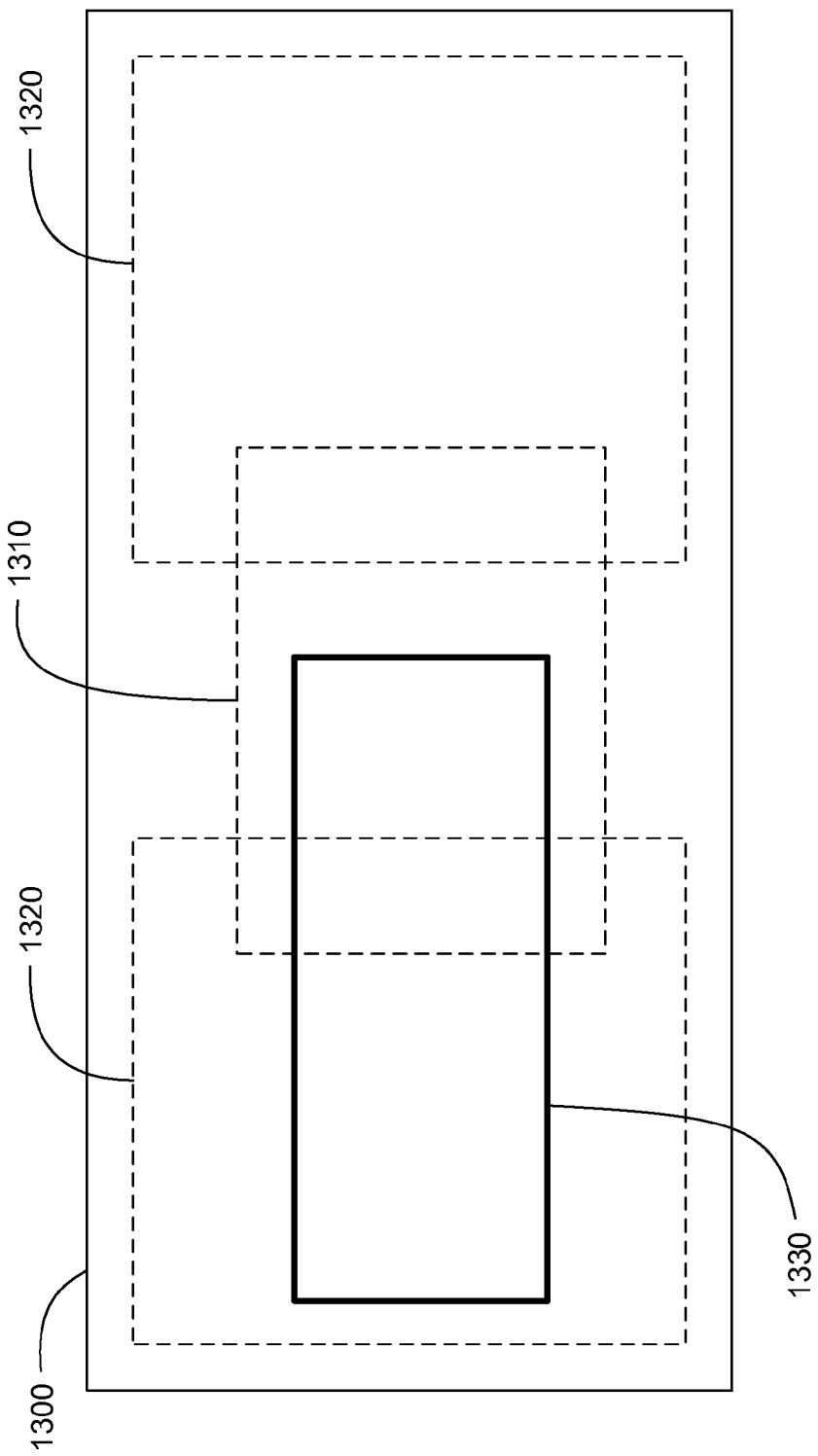
FIG. 14 shows another flattened representation of the operator and robot views of FIG. 13 according to an embodiment of the present invention.

With renewed reference to FIG. 13, an operator view 1330 can be seen in an initial position with respect to the robot view 1300. In those embodiments in which the logic 1175 is configured to receive signals from the head-tracking sensor 1120, the logic 1175 changes the orientation of the operator frame of reference relative to the robot frame of reference according to the signals from the head-tracking sensor 1120. Since the operator view 1330 is fixed in the operator frame of reference, the first transformation is applied to the operator view 1330 to reposition the operator view 1330 to a new position with respect to the robot view 1300. Thus, for example, if the operator 1105 turns his head to the left, the operator view 1330 will correspondingly move left in FIG. 13, to a new position as illustrated by FIG. 14. Rotation of the operator view 1330 relative to the robot view 1300 is also possible, for instance, where the operator's head rolls clockwise or counterclockwise. In those embodiments where the signals from the head-tracking sensor 1120 are also used to aim the video cameras 1130, as the aim of video cameras 1130 follow the orientation of the operator's head, the operator view 1330 will return to the initial position in FIG. 13.

In some embodiments, the logic 1175 additionally or alternatively receives signals from the pose sensors 1135 which are used to reposition the operator view 1330 relative to the robot view 1300 to correct for certain motions of the robot 1110 in order to steady the image rendered to the display 1125 by the image rendering logic 1160. To illustrate, if the robot 1110 is rocking back and forth while balancing, in other words, if the robot 1110 is pitching around the X-axis (FIG. 2), then the portions of the robot's visual environment visible within the fields of view 1215, 1235 of the several video cameras 1130 will vary with the rocking. For this simple pitching motion, the robot's visual environment moves up and down through the fields of view 1215 of the cameras 1210 along a vertical line. For a peripheral camera 1230 aimed parallel to the X-axis, on the other hand, the robot's visual environment within the field of view 1235 will rotate clockwise and counterclockwise around the centerline 1250 and can also move back and forth along a horizontal line. Peripheral cameras 1230 aimed in other directions can observe combinations of these effects.

When the logic 1175 receives signals from the pose sensors 1135 that indicate a change in the posture of the robot 1110 due to bending or balancing, for example, the logic 1175 calculates from those signals the changes in the positions and aiming of the video cameras 1130 relative to the external frame of reference. The logic 1175 is further configured to define a second transformation between the robot frame of reference and the operator frame of reference that mirrors the changes in the positions and aiming of the video cameras 1130 relative to the external frame of reference.

The second transformation, when applied to the operator view 1330, varies the position of the operator view 1330 relative to the robot view 1300 in an inverse relationship to the changes in the positions and aiming of the video cameras 1130. As an example, where the robot 1110 pitches forward, and the robot's visual environment moves upward through the fields of view 1215 of the cameras 1210, the logic 1175 shifts the operator view 1330 relative to the robot view 1300 such that in FIG. 13 the operator view 1330 would shift upward from the initial position. Accordingly, an image of the robot's visual environment rendered within the operator view 1330 and displayed on the display 1125 can remain approximately stationary while the robot 1110 balances and performs other tasks. In some embodiments the logic 1175 determines the second transformation only as a function of the pitch of the video cameras 1130, while in other embodiments the second transformation can also be a function of either or both of yaw and roll. In further embodiments, the second transformation can also be a function of a spatial translation of the video cameras 1130.

In sum, the logic 1175 is configured to provide two transformations that dictate what portion of the robot's visual environment is presented to the display 1125 by the image rendering logic 1160. One transformation corrects for certain motions of the robot 1110, such as rocking due to balancing. Here, the portion of the visual environment presented to the display 1125 varies in parallel with the motions of the robot 1110 so that the image rendered to the display 1125 is steady despite those motions. The second transformation corrects for any difference between where the operator 1105 is looking and where the video cameras 1130 are presently aimed, for instance, when the video cameras 1130 are being repositioned in response to signals from the head-tracking sensor 1120.

The image rendering logic 1160 receives video signals from the video cameras 1130, as optionally corrected by lens correction logic 1155, and also receives the transformations determined by the logic 1175. The image rendering logic 1160 is configured to stitch together the video signals from video cameras 1130 where the fields of view 1115, 1235 overlap in order to generate a composite video signal that is mapped to the robot view 1330. Exemplary techniques for stitching together the video signals include cross fading and view morphing. The image rendering logic 1160 is also configured to apply the transformations received from the logic 1175 to reposition the operator view 1330 relative to the robot view 1300. The image rendering logic 1160 is further configured to render an image to the display 1125 from the portion of the composite video signal that maps to the operator view 1330.

Methods for stitching video signals for differently aimed video cameras 1130 are discussed in detail in US Published Application 2006/0066730 which is incorporated herein by reference. Further methods for stitching video signals are described in "Seamless Image Stitching of Scenes with Large Motions and Exposure Differences" by Ashley Eden et al., Computer Vision and Pattern Recognition (CVPR), 2006, which is incorporated herein by reference. Methods for view morphing are discussed in detail in "View Morphing" by Steven M. Seitz and Charles R. Dyer published in the Proceedings of SIGGRAPH, New Orleans, La., Aug. 4, 1996, which is incorporated herein by reference.

The image rendering logic 1160 renders the image to the display 1125 as if projected onto a screen at a distance from a point in the operator space. Where the display 1125 comprises a head-mounted display, the point is defined to be between the eyes of the operator 1105. In those embodiments where the display 1125 is configured to provide stereo video image, the image rendering logic 1160 is configured to give each eye a set of coordinates and images are presented selectively with only the video from the left video camera 1210 being presented to the operator's left eye and only the video from the right video camera 1210 being presented to the operator's right eye.

Additionally, the image rendering logic 1160 can be configured to receive the heads up display from the heads up display generation logic 1165 and add the heads up display to the image rendered to the display 1125. In some embodiments, the heads up display is rendered as if located at an infinite distance from the operator 1105.

Further, in some embodiments the image rendering logic 1160 is configured to provide augmented reality by adding virtual features to the visual environment of the image rendered by the logic 1160. As one example, a visual marker can be added to the visual environment as a virtual feature to mark a target location that the robot 1110 is moving to, or for the operator 1105 to direct the robot 1110 to place an object. A visual marker can also be used to represent the robot gaze, in those embodiments where the robot 1110 comprises a humanoid form, where the robot gaze indicate where people in the vicinity of the robot 1110 will perceive the center of attention of the robot 1110 to be. As another example, a wrist watch can be added as a virtual feature to an arm of the robot 1110. Still another example of a virtual feature comprises a 3D rendering of the robot 1110 so that the operator 1105 can see a representation of the pose of the robot 1110.

The image rendering logic 1160 can obtain information from which to generate augmented reality features from the heads up display generation logic 1165, the pose sensors 1135, and data sources 1145 and 1170. Logic for generating augmented reality, in some embodiments, is a separate function from the image rendering logic 1160 with an output to the image rendering logic 1160. In further embodiments, augmented reality logic is integrated with the heads up display generation logic 1175.

In some embodiments, the image rendering logic 1160 can vary the angular span of the operator view 1330 presented on the display 1125. To illustrate, the human eye has a field of view that spans close to 150 degrees while an exemplary display 1125 has a field of view that spans only about 40 degrees diagonal, and this can appear to the operator 1105 as extreme tunnel vision. Hence, the image rendering logic 1160 can map a larger operator view 1330 onto the display 1125, for example, about 60 degrees. Mapping a larger operator view 1330 onto the display 1125 provides the sensation of zooming out. When the operator 1105 wants to inspect a portion of the robot's visual environment in more detail, the operator 1105 can command the image rendering logic 1160 to change the operator view 1330 to be 40 degrees or narrower. Changing the size of the operator view 1330 in this manner would be represented in FIG. 13 by increasing or decreasing the size of the operator view 1330 relative to the robot view 1300.

Figure 15:
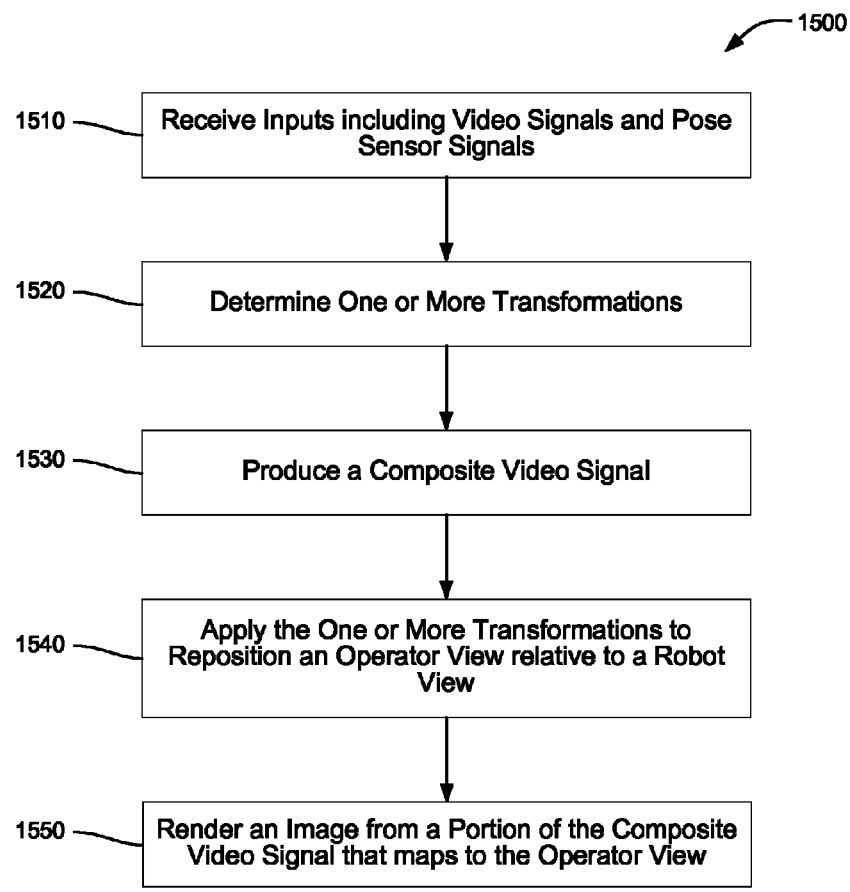
FIG. 15 illustrates a method for providing visual telepresence to an operator of a robot according to an exemplary embodiment of the present invention.

FIG. 15 illustrates a method 1500 for providing visual telepresence to an operator 1105 of a robot 1110 according to an exemplary embodiment. The method 1500 comprises a step 1510 of receiving inputs including video signals and pose sensor signals. Here, the video signals are from a plurality of video cameras 1130 attached to the robot 1110 including a pair of stereo cameras 1210 and at least one peripheral camera 1230. Other inputs received in step 1510 can comprise head-tracking signals from a head-tracking sensor 1120, and data from a data source such as a data source 1145 of the robot 1110 or a data source 1170 external to the robot 1110.

The method 1500 also comprises a step 1520 of determining one or more transformations. A first transformation is determined by determining, from the pose sensor signals, a change in the aiming of the plurality of cameras 1130 relative to an external frame of reference. The method 1500 optionally can comprise determining a second transformation. The second transformation is determined by determining, from head-tracking signals, a change in an orientation of a head of the operator 1105.

The method 1500 further comprises a step 1530 of producing a composite video signal by stitching together the video signal received from the at least one peripheral camera 1230 with the video signal received from the at least one of the pair of video cameras 1210. Here, the composite video signal maps to a robot view 1300. In various embodiments, stitching together the video signals can comprise either or both of cross fading and view morphing. Producing the composite video signal can comprise, in some instances, applying a lens correction to the video signals.

The method 1500 further comprises a step 1540 of applying the one or more transformations to reposition an operator view 1330 relative to the robot view 1300. Then, in a step 1550, an image is rendered to a display 1125 from that portion of the composite video signal that maps to the operator view 1330.

In various embodiments, logic such as balance maintaining logic 430, base angle determining logic 510, position tracking logic 610, movement logic 620, control input logic 640, and the logic of controller 1115 comprise hardware, firmware, and/or software stored on a computer readable medium, or combinations thereof. Such logic may include a computing device such as an integrated circuit, a microprocessor, a personal computer, a server, a distributed computing system, a communication device, a network device, or the like. A computer readable medium can comprise volatile and/or non-volatile memory, such as random access memory (RAM), dynamic random access memory (DRAM), static random access memory (SRAM), magnetic media, optical media, nano-media, a hard drive, a compact disk, a digital versatile disk (DVD), and/or other devices configured for storing digital or analog information. Various logic described herein also can be partially or entirely integrated together, for example, balance maintaining logic 430 and base angle determining logic 510 can comprise the same integrated circuit. Various logic can also be distributed across several computing systems.

It will be appreciated that the control of the robot 100 described above can also be configured such that the waist angle is determined from the base angle. In these embodiments the appropriate waist angle is determined, responsive to a varying base angle, and the waist angle is changed while the base angle varies to keep the robot 100 balanced and in approximately a constant location. Control systems for keeping the robot 100 balanced and maintained at an approximate location by bending at the waist joint 150 in response to a varying base angle are analogous to the control systems described above.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A controller for a robotic system comprising:
video decompression logic configured to decompress video signals received from a plurality of video cameras;
lens correction logic configured to correct and remove image distortions from the decompressed video signals received from the video decompression logic;
operator view in robot space logic configured to
receive signals from a plurality of pose sensors, and
generate a first transformation between a robot frame of reference and an operator frame of reference from the signals received from the pose sensors; and image rendering logic configured to render an image from the decompressed and corrected video signals by
stitching together the decompressed and corrected video signals to form a composite video signal that maps to a robot view,
applying the first transformation to an operator view, different than the robot view, in order to reposition the operator view relative to the robot view, and
rendering to the display a portion of the composite video signal that maps to the operator view, wherein applying the first transformation to the operator view serves to steady the portion of the composite video signal rendered to the display.

2. The controller of claim 1 wherein the operator view in robot space logic is further configured to receive signals from a head-tracking sensor and generate a second transformation responsive to the signals from the head-tracking sensor.

3. The controller of claim 1 further comprising heads up display generation logic configured to receive data from a data source, generate a heads up display from the data, and provide the heads up display to the image rendering logic.

4. The controller of claim 1 wherein the image rendering logic is further configured to vary a size of the portion of the composite video signal that maps to the operator view.

5. The controller of claim 1 wherein stitching together the decompressed and corrected video signals comprises cross fading.

6. A method for providing visual telepresence to an operator of a robot comprising:
receiving video signals from a plurality of video cameras attached to a robot including a pair of stereo video cameras and at least one peripheral camera;
receiving pose sensor signals from a plurality of pose sensors;
determining from the pose sensor signals a change in the aiming of the plurality of cameras relative to an external frame of reference;
determining a first transformation from the change;
producing a composite video signal that maps to a robot view by stitching together the video signal from the at least one peripheral camera with a video signal from at least one of the pair of stereo video cameras;
applying the first transformation to reposition an operator view relative to the robot view, the operator view being different than the robot view; and
rendering an image to a display from that portion of the composite video signal that maps to the operator view, wherein applying the first transformation to reposition the operator view serves to steady the image rendered to the display.

7. The method of claim 6 further comprising
receiving head-tracking signals from a head-tracking sensor;
determining from the head-tracking signals a change in an orientation of a head of the operator;
determining a second transformation from the change in the orientation of the head; and
applying the second transformation to vary the operator view.

8. The method of claim 6 wherein producing the composite video signal comprises applying a lens correction to the video signals.

9. The method of claim 6 further comprising receiving data from a data source, generating a heads up display from the data, and adding the heads up display to the rendered image.

* * * * *